(12) United States Patent
Endo et al.

(10) Patent No.: US 8,200,294 B2
(45) Date of Patent: Jun. 12, 2012

(54) MOBILE TERMINAL APPARATUS

(75) Inventors: Isao Endo, Kanagawa (JP); Kazuhiro Kato, Tokyo (JP)

(73) Assignee: Sony Mobile Communications AB, Lund (SE)

( * ) Notice: Subject to any disclaimer, the term of this patent is extended or adjusted under 35 U.S.C. 154(b) by 109 days.

(21) Appl. No.: 12/662,456

(22) Filed: Apr. 19, 2010

(65) Prior Publication Data

US 2010/0285853 A1    Nov. 11, 2010

(30) Foreign Application Priority Data

May 11, 2009 (JP) ................................. 2009-114951

(51) Int. Cl.
*H04M 1/00* (2006.01)
*H04M 1/38* (2006.01)

(52) U.S. Cl. ................ 455/575.1; 455/575.3; 455/575.4

(58) Field of Classification Search ............... 455/575.1, 455/575.3, 575.4
See application file for complete search history.

(56) References Cited

U.S. PATENT DOCUMENTS

| | | | | |
|---|---|---|---|---|
| 2009/0048006 A1* | 2/2009 | Liao et al. | ................... | 455/575.3 |
| 2009/0286574 A1* | 11/2009 | Kim et al. | ..................... | 455/566 |
| 2010/0087232 A1* | 4/2010 | Yeh et al. | ................... | 455/575.4 |

FOREIGN PATENT DOCUMENTS

| | | |
|---|---|---|
| EP | 2 031 838 A1 | 3/2009 |
| EP | 2 031 839 A1 | 3/2009 |
| EP | 2 175 619 A1 | 4/2010 |
| JP | 2008-167847 | 6/2005 |
| JP | 2007-166621 A | 6/2007 |
| KR | 2006-0076338 A | 7/2006 |

OTHER PUBLICATIONS

European Search Report issued Aug. 18, 2010 for corresponding European Application No. 10 16 1365.

* cited by examiner

*Primary Examiner* — Wen Huang
(74) *Attorney, Agent, or Firm* — Rader Fishman & Grauer, PLLC

(57) ABSTRACT

A mobile terminal apparatus includes a first housing provided with a display, a second housing provided with a keyboard, and a slide holding mechanism including a rail unit provided in the first housing and including rail parts extending in a sliding direction, arm members, rotation-slide connection members which include rotation shafts separated from each other in the sliding direction and which connect one end portions of the arm members to the rail parts, and rotation connection members which include rotation shafts separated from each other in the sliding direction and which connect the other end portions of the arm members to the second housing. The slide holding mechanism holds the housings such that the housings are slidable between a closed state in which the housings substantially entirely overlap and an open state in which the display unit and the keyboard are positioned on substantially the same plane.

7 Claims, 14 Drawing Sheets

SEPARATED BY PREDETERMINED INTERVALS
(SEVERAL MILLIMETERS)

MOBILE TERMINAL APPARATUS

BACKGROUND OF THE INVENTION

1. Field of the Invention

The present invention relates to mobile terminal apparatuses suitable for use as mobile devices, such as a mobile phone, a personal handyphone system (PHS), a personal digital assistant (PDA), a mobile game device, and a digital camera, which include a first housing and a second housing that can be set to an open state or a closed state by sliding the first and second housings along each other.

More specifically, the present invention relates to a mobile terminal apparatus in which, when the first and second housings are set to the open state by sliding the first and second housings along each other, a keyboard provided on the second housing and a display unit provided on the first housing are positioned on the same plane so that the area in which the keyboard is exposed is increased and an input operation can be easily performed on a large input operation surface.

2. Description of the Related Art

Japanese Unexamined Patent Application Publication No. 2005-167847 (hereinafter referred to as Patent Document 1) discloses a mobile communication terminal with which a sliding operation can be easily performed. This mobile communication terminal includes a display housing provided with a display unit and an operation housing provided with a button operation unit. The display housing is slidable along the operation housing, and the state of the mobile communication terminal can be switched between an exposed state in which the button operation unit is exposed and a covered state in which the button operation unit is covered by the display housing in response to the sliding operation of the display housing.

A first helical compression spring is disposed in an antenna containing section provided in the operation housing, and the operation housing is urged by an urging force of the first helical compression spring in a direction for changing the state of the mobile communication terminal from the covered state to the exposed state. Thus, the sliding operation of the display housing in the process of setting the mobile communication terminal to the exposed state is facilitated.

SUMMARY OF THE INVENTION

However, when the mobile communication terminal disclosed in Patent Document 1 is in the exposed state in which the button operation unit is exposed, about a half of the display housing overlaps about a half of the operation housing. In other words, the display housing and the operation housing are on different planes. Therefore, the area in which buttons included in the button operation unit can be arranged is limited to about a half of the area of the operation housing, which causes the following disadvantages:

1. Since the area of the button operation unit is small, intervals between the buttons disposed next to each other in the button operation unit are also small.
2. Since the area of the button operation unit is small, the sizes of the buttons that can be arranged in the button operation unit are limited.
3. Since the area of the button operation unit is small, the number of buttons that can be arranged in the button operation unit is also limited.

As a result, there has been a problem that it is difficult to facilitate the input operation.

In view of the above-described situation, it is desirable to provide a mobile terminal apparatus in which an area of an input operation surface of a keyboard can be increased so that the input operation can be facilitated in a slide-type mobile device.

According to an embodiment of the present invention, a mobile terminal apparatus includes a first housing on which a display unit is provided at an open side of the first housing; a second housing on which a keyboard is provided at an exposing side of the second housing, the exposing side being exposed when the first and second housings are in an open state; and a slide holding mechanism configured to hold the first and second housings such that the first and second housings are slidable. The slide holding mechanism includes a rail unit provided in the first housing and including a pair of rail parts that extend along a sliding direction of the first and second housings, a pair of arm members, a pair of rotation-slide connection members, each rotation-slide connection member including a rotation shaft that extends in a direction perpendicular to the sliding direction and connecting one end portion of the corresponding arm member to the corresponding rail part such that the arm member is slidable and rotatable, extension lines of the rotation shafts included in the rotation-slide connection members being separated from each other by a predetermined distance in the sliding direction, and a pair of rotation connection members, each rotation connection member including a rotation shaft that extends in the direction perpendicular to the sliding direction and connecting the other end portion of the corresponding arm member to the second housing such that the arm member is rotatable, extension lines of the rotation shafts included in the rotation connection members being separated from each other by the predetermined distance in the sliding direction.

The slide holding mechanism holds the first and second housings such that the first and second housings are slidable between a closed state in which the first and second housings substantially entirely overlap and the open state in which the display unit provided on the first housing and the keyboard provided on the second housing are positioned on substantially the same plane.

According to the embodiment of the present invention, in a process of setting the first and second housings to the open state, the slide holding mechanism causes the first and second housings to slide such that the display unit provided on the first housing and the keyboard provided on the second housing are positioned on substantially the same plane.

Accordingly, when the mobile terminal apparatus is in the open state, the area in which the first and second housings overlap is eliminated and the entire area of the exposing surface of the second housing can be used as an area in which the keyboard can be disposed.

According to the embodiment of the present invention, the entire area of the exposing surface of the second housing can be used as the area for placing the keyboard. Therefore, the input operation area of the keyboard can be increased.

As a result, intervals between keys included in the keyboard can be increased, and the input operation can be facilitated.

In addition, since the area of the input operation surface of the keyboard can be increased, keys that are physically larger than those in the structure of the related art can be provided on the keyboard. This also facilitates the input operation.

In addition, since the area of the input operation surface of the keyboard can be increased, a larger number of keys can be provided on the keyboard compared to the structure of the related art.

DESCRIPTION OF THE PREFERRED EMBODIMENTS

Embodiments of the present invention may be applied to slide-type mobile phones that can be set to an open state or a closed state by sliding a first housing and a second housing along each other.

Structure of Mobile Phone of First Embodiment

Figure 1:
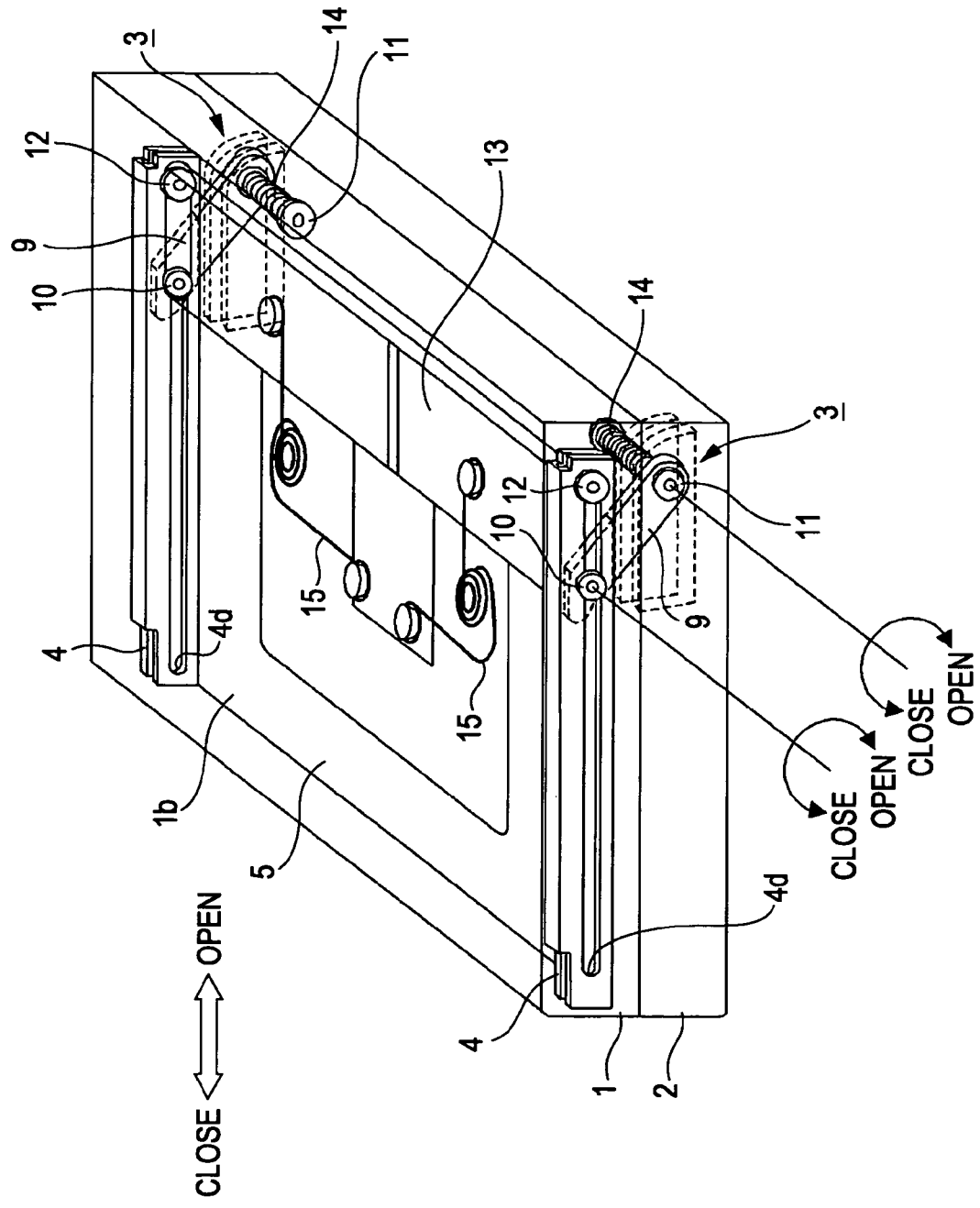
FIG. 1 is a see-through perspective view of a mobile phone according to a first embodiment of the present invention in a closed state viewed from the right side.
Figure 2:
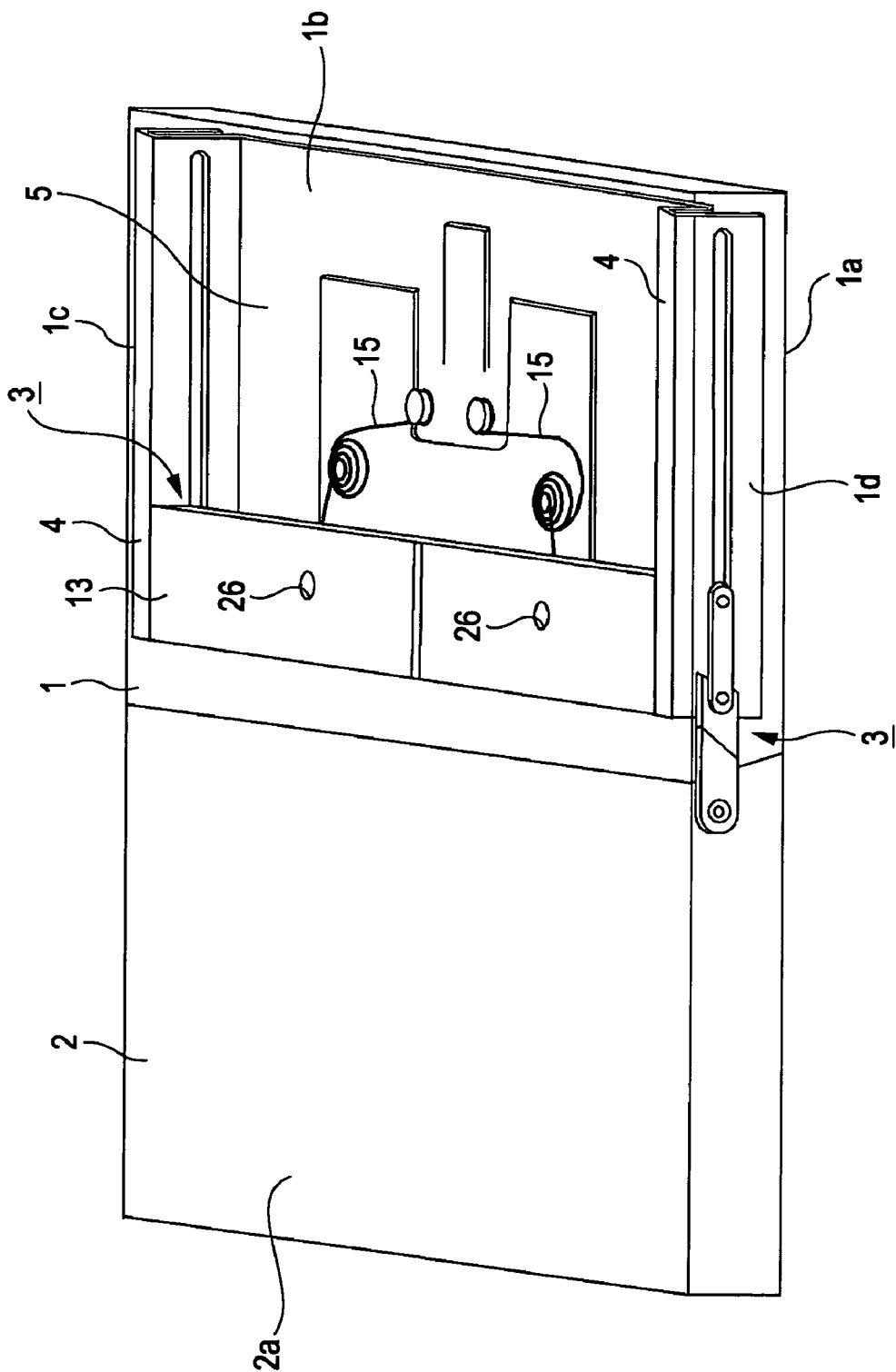
FIG. 2 is a see-through perspective view of the mobile phone according to the first embodiment in an open state viewed from the right side.

FIG. 1 shows a mobile phone according to a first embodiment of the present invention in the closed state. FIG. 2 shows the mobile phone according to the first embodiment in the open state. FIG. 1 is a see-through perspective view of the main part of the mobile phone in the closed state viewed from the right side. FIG. 2 is a see-through perspective view of the main part of the mobile phone in the open state viewed from the right side.

As is clear from FIGS. 1 and 2, the mobile phone includes a first housing 1 having a substantially rectangular box shape, a second housing 2 having a rectangular box shape with substantially the same size as the size of the first housing 1, and a slide holding mechanism 3. The slide holding mechanism 3 holds the housings 1 and 2 such that the housings 1 and 2 can slide along each other in short-side directions thereof between the closed state (see FIG. 1) in which the housings 1 and 2 substantially entirely overlap and the open state (see FIG. 2) in which the housings 1 and 2 are positioned on the same plane.

A display unit, such as a liquid crystal display or an organic electro luminescence (EL) display, is provided on an open surface 1b of the first housing 1 at the side opposite to a slide surface 1a which slides along the second housing 2. Therefore, in this mobile phone, the display unit is constantly exposed irrespective of whether the housings 1 and 2 are in the closed state or the open state. The second housing 2 is provided with a keyboard on an exposing surface 2a thereof that is exposed when the housings 1 and 2 are in the open state.

The slide holding mechanism 3 includes a rail plate 5 on which a pair of rail parts 4 are formed and a pair of arm parts 9. Each arm part 9 is slidably and rotatably connected to the corresponding rail part 4 on the rail plate 5 at one end thereof and is rotatably connected to the second housing 2 at the other end thereof.

The slide holding mechanism 3 also includes a pair of rotation-slide connection members 10 and a pair of rotation connection members 11. Each rotation-slide connection member 10 includes a rotation shaft that extends perpendicular to the sliding directions of the housings 1 and 2 and connects one end of each arm part 9 to the corresponding rail part 4 in a slidable and rotatable manner. Each rotation connection member 11 includes a rotation shaft that extends perpendicular to the sliding directions of the housings 1 and 2 and connects the other end of each arm part 9 to the second housing 2 in a rotatable manner.

The slide holding mechanism 3 also includes a pair of slide assisting members 12 which serve to stabilize the sliding movements of the housings 1 and 2 and a connection plate 13. The connection plate 13 connects the rotation-slide connection members 10 to each other without changing the slidable and rotatable state of the arm parts 9, and also connects the slide assisting members 12 to each other without changing the slidable state thereof.

The slide holding mechanism 3 also includes a pair of first spring members 14 and a pair of second spring members 15. The first spring members 14 are provided on the respective rotation connection members 11 and urge the arm parts 9 in a direction for setting the housings 1 and 2 to the closed state. Each of the second spring members 15 is connected to the connection plate 13 at one end thereof and to the first housing 1 at the other end thereof. When the rotational position of each arm part 9 corresponds to the closed state of the housings 1 and 2, the second spring members 15 apply an urging force to the arm parts 9 through the connection plate 13 in the direction for setting the housings 1 and 2 to the closed state. When the rotational position of each arm part 9 corresponds to the open state of the housings 1 and 2, the second spring members 15 apply the urging force to the arm parts 9 through the connection plate 13 in a direction for setting the housings 1 and 2 to the open state. Thus, the urging direction of the second spring members 15 is changed in accordance with the rotational position of each arm part 9.

Figure 3:
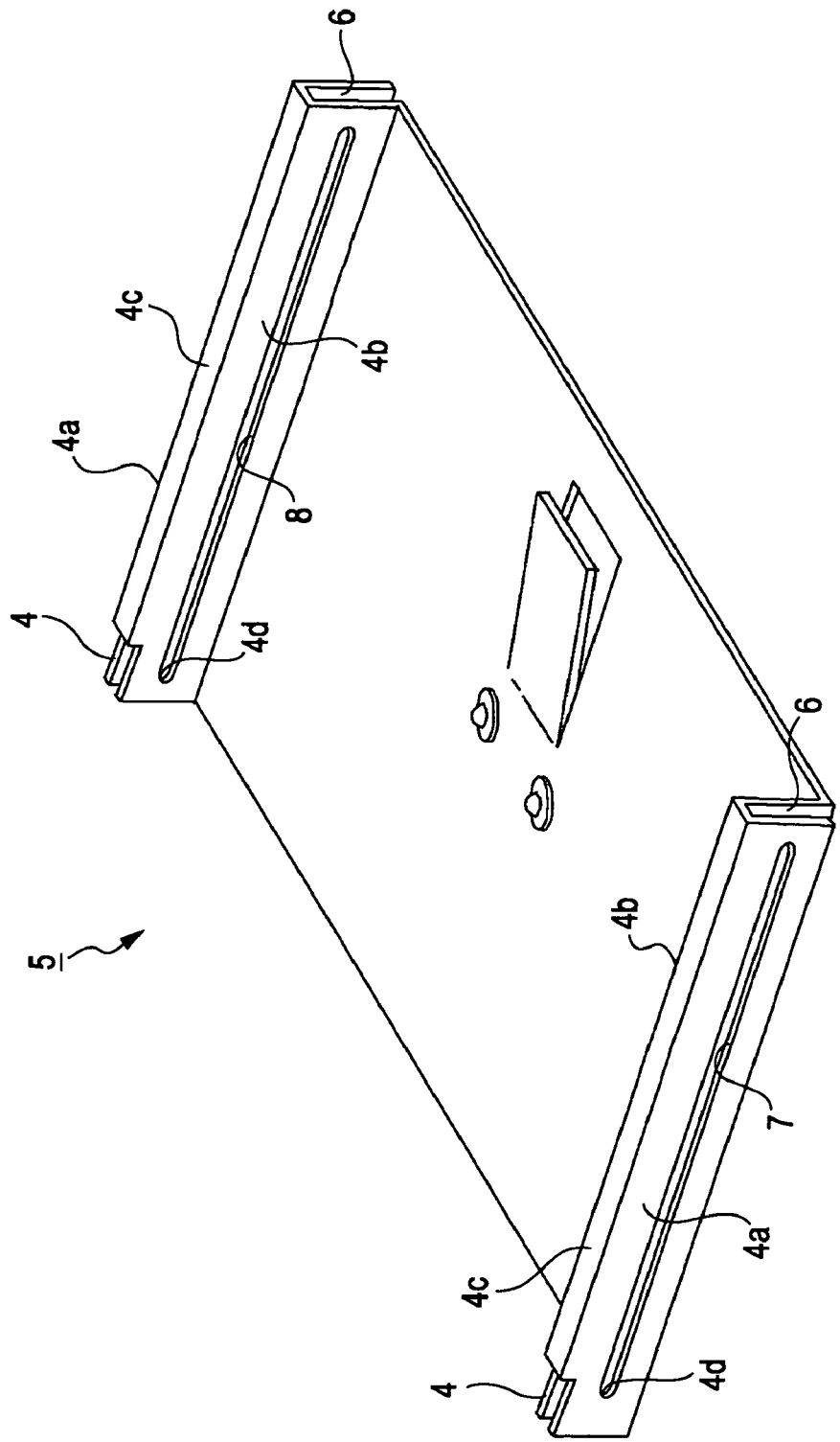
FIG. 3 is a perspective view of a rail plate included in the mobile phone according to the first embodiment.

As shown in FIG. 3, the rail plate 5 has a substantially rectangular plate shape that is slightly smaller than the first housing 1 so that the rail plate 5 can be disposed in the first housing 1. Referring to FIG. 3, short side portions of the rail plate 5 are bent in a direction perpendicular to the longitudinal direction of the rail plate 5, and the thus-bent portions are further bent into a mountain fold. Thus, the pair of rail parts 4 are formed such that the rail parts 4 extend along short side portions 1c and 1d of the first housing 1 at positions close to the short side portions 1c and 1d.

Each of the rail parts 4 on the rail plate 5 has a groove 6 in which the corresponding arm part 9 is disposed in a slidable manner. In addition, each rail part 4 includes an outer wall portion 4a in which a slide hole 7 is formed so as to extend in the longitudinal direction of the rail part 4. Similarly, each rail part 4 includes an inner wall portion 4b in which a slide hole 8 is formed so as to extend in the longitudinal direction of the rail part 4. The slide hole 7 in the outer wall portion 4a of each rail part 4 and the slide hole 8 in the inner wall portion 4b of the rail part 4 are opposed to each other. Therefore, the slide hole 7 and the slide hole 8 communicate with each other in short-side directions of each rail part 4.

Figure 4:
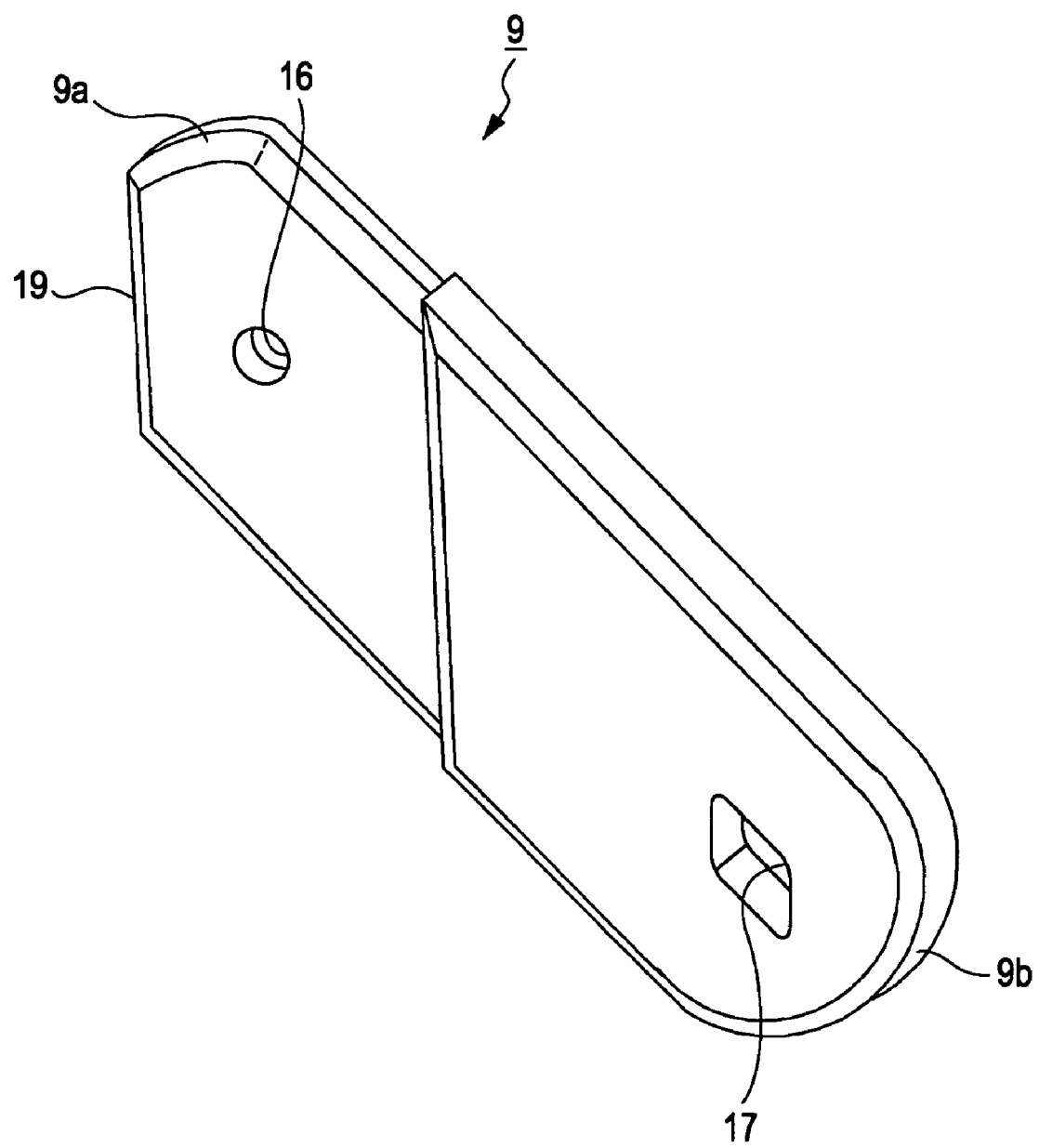
FIG. 4 is a perspective view of an arm part included in the mobile phone according to the first embodiment.

As shown in FIG. 4, each arm part 9 has a substantially elliptical plate shape, and a first connection hole 16 for connecting the arm part 9 to the corresponding rail part 4 is formed at a position near one end portion 9a of the arm part 9 so as to extend through the arm part 9 in a direction perpendicular to the longitudinal direction thereof. In addition, a second connection hole 17 for connecting the arm part 9 to the second housing 2 is formed at a position near the other end portion 9b of the arm part 9 so as to extend through the arm part 9 in the direction perpendicular to the longitudinal direction thereof. In addition, the end portion 9a of each arm part 9 is provided with a cut section 19 that is cut such that the end portion 9a can be brought into line contact with an upper wall portion 4c (see FIG. 3) of the corresponding rail part 4.

Figure 5:
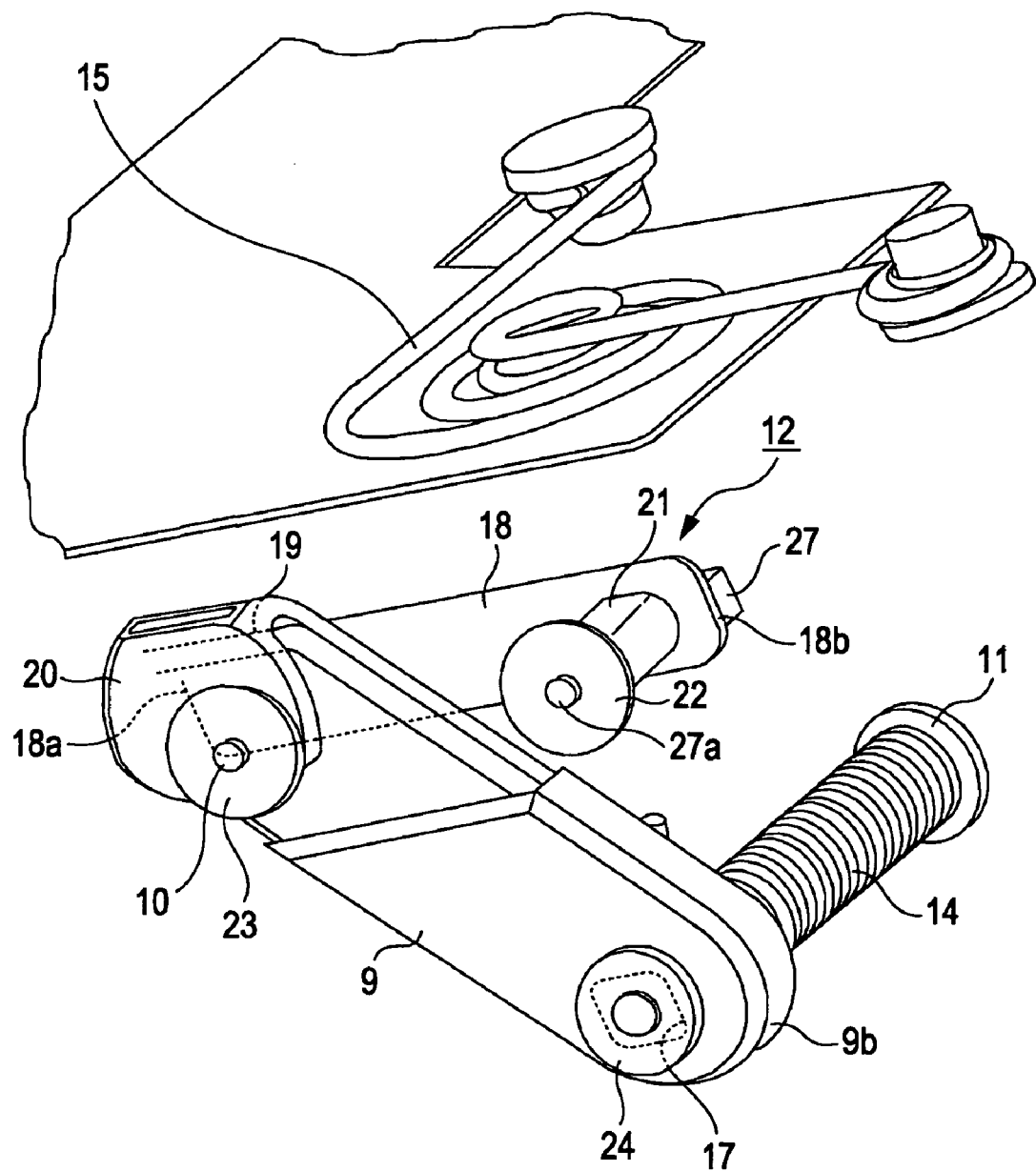
FIG. 5 is a perspective view of a slide holding mechanism included in the mobile phone according to the first embodiment.

FIG. 5 is a perspective view illustrating the manner in which each arm part 9 is connected to the corresponding rotation connection member 11 and the corresponding slide assisting member 12. As is clear from FIG. 5, each slide assisting member 12 includes a main assisting body 18 having a rectangular plate shape and a guide shaft 21 provided so as to project from the main assisting body 18 in a direction perpendicular to the longitudinal direction of the main assisting body 18. The guide shaft 21 is inserted through the slide holes 7 and 8 in the corresponding rail part 4 so as to guide the movement of the main assisting body 18 along the slide holes 7 and 8. The guide shaft 21 is fixed with a screw to the main assisting body 18 at a position near an end portion 18b thereof together with a retaining washer 22.

The end portion 9a of each arm part 9 is provided with a slide cover 20 that covers the end portion 9a and that has a shape corresponding to the shape of the cut section 19. The slide cover 20 serves to reduce friction so that the end portion 9a of the arm part 9 can slide along the rail part 4 with a low friction.

Thus, the end portion 9a of each arm part 9 is covered by the slide cover 20. In this state, the end portion 9a is connected to the slide assisting member 12 at a position near an end portion 18a of the main assisting body 18 by the rotation-slide connection member 10 which extends through the first connection hole 16 and to which a retaining washer 23 is attached. The rotation-slide connection member 10 has a substantially columnar shape. Thus, each arm part 9 and the corresponding slide assisting member 12 are rotatably connected to each other.

The end portion 9b of each arm part 9 is connected to the corresponding rotation connection member 11 such that the rotation connection member 11 extends through the second connection hole 17 and projects from the arm part 9 at the same side as the slide assisting member 12. The rotation connection member 11 includes a shaft member having a substantially columnar shape. One end portion of the shaft member extends through the second connection hole 17 in the arm part 9 and is connected to the arm part 9 with a retaining washer 24. Therefore, the arm part 9 is rotatable with respect to the rotation connection member 11.

Each first spring member 14, which is a so-called helical spring, is provided on the shaft member of the corresponding rotation connection member 11 such that the first spring member 14 is prevented from falling off by a washer provided at the other end portion of the shaft member. The first spring member 14 is engaged with a projection on a back surface of the corresponding arm part 9 at one end thereof and is fixed to the second housing 2 at the other end thereof, so that the arm part 9 is urged in the direction for setting the housings 1 and 2 to the closed state.

Figure 6:
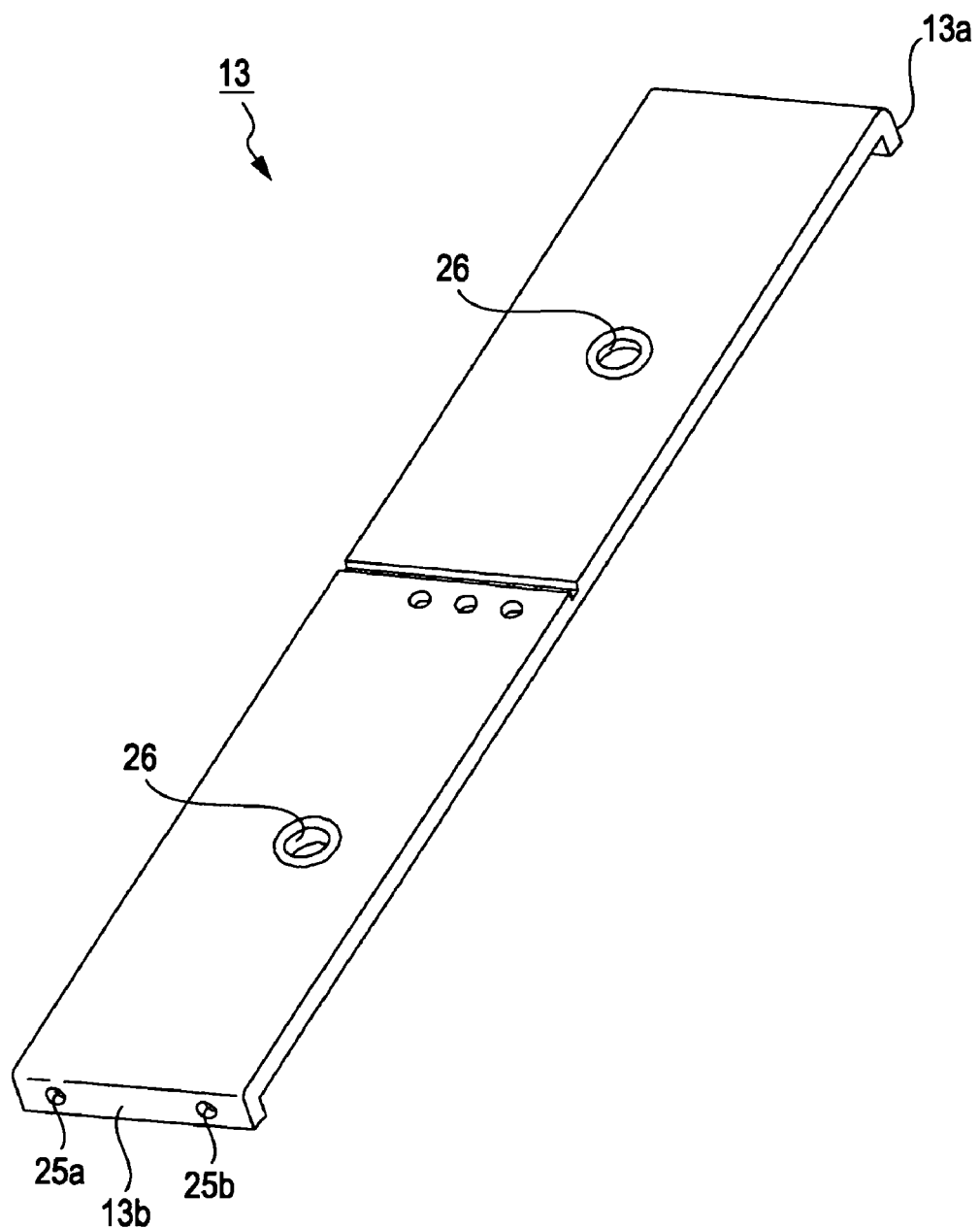
FIG. 6 is a perspective view of a connection plate included in the mobile phone according to the first embodiment.

Referring to FIG. 6, the connection plate 13 has a substantially rectangular plate shape. The connection plate 13 connects the rotation-slide connection members 10 to each other without changing the above-described slidable and rotatable state thereof, and also connects the slide assisting members 12 to each other without changing the slidable state thereof.

The length of the connection plate 13 in the longitudinal direction thereof is slightly smaller than the distance between the rail parts 4 on the rail plate 5. Therefore, the connection plate 13 can be disposed between the rail parts 4 on the rail plate 5 with some allowances.

Short-side edge portions 13a and 13b of the connection plate 13 are bent in a direction perpendicular to the longitudinal direction of the connection plate 13. In each of the bent portions, an arm connection hole 25a for connecting the connection plate 13 to each arm part 9 and a slide-assisting-member connection hole 25b for connecting the connection plate 13 to each slide assisting member 12 are formed next to each other.

In addition, spring retaining holes 26 are formed in left and right sections of the connection plate 13 at central positions thereof. As shown in FIGS. 1 and 2, the second spring members 15 are connected to the respective spring retaining holes 26 at one end thereof, and are connected to the first housing 1 at the other end thereof. In this mobile phone, the urging force of the second spring members 15 is transmitted to the arm parts 9 through the connection plate 13, the rotation-slide connection members 10, and the slide assisting members 12.

More specifically, when the rotational position of each arm part 9 corresponds to the closed state of the housings 1 and 2, the urging force of the second spring members 15 is transmitted to the arm parts 9 through the connection plate 13, the rotation-slide connection members 10, and the slide assisting members 12 as an urging force for setting the housings 1 and 2 to the closed state. In the case where the rotational position of each arm part 9 corresponds to the open state of the housings 1 and 2, the urging force of the second spring members 15 is transmitted to the arm parts 9 through the connection plate 13, the rotation-slide connection members 10, and the slide assisting members 12 as an urging force for setting the housings 1 and 2 to the open state.

In the mobile phone, the slide holding mechanism 3 holds the housings 1 and 2 such that the housings 1 and 2 are slidable between the closed state in which the housings 1 and 2 substantially entirely overlap and the open state in which the display unit provided on the first housing 1 and the keyboard provided on the second housing 2 are positioned on substantially the same plane. In this structure, if the rotation-slide connection members 10 are provided on the first housing 1 such that the rotation shafts, around which the arm parts 9 are rotated, of the rotation-slide connection members 10 are opposed to and aligned with each other and the rotation connection members 11 are provided on the second housing 2 such that the rotation shafts of the rotation connection member 11 are opposed to and aligned with each other, it becomes difficult to perform the sliding operation for setting the housings 1 and 2 to the open state. This is because allowances of the movable ranges of the arm parts 9 are reduced if the rotation shafts are arranged so as to be opposed to and aligned with each other.

Figure 7:
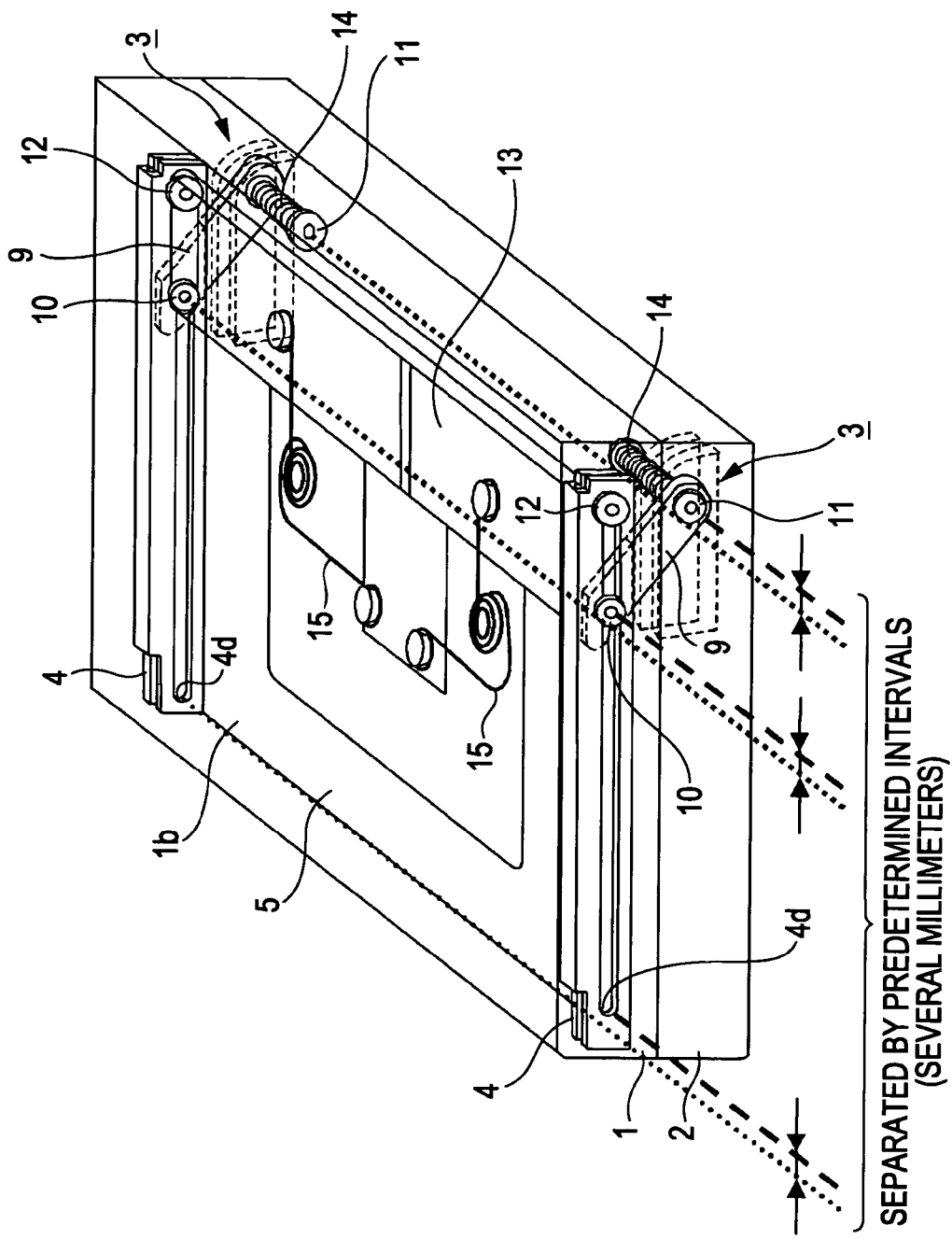
FIG. 7 is a diagram illustrating the structure of the mobile phone according to the first embodiment in which rotation shafts and other components at the left and right sides are displaced from each other by a predetermined distance in a sliding direction.

Therefore, in this mobile phone, the rotation-slide connection members 10 are arranged such that the rotation shafts of the rotation-slide connection members 10 are separated from each other by, for example, 2 mm in the sliding direction of the housings 1 and 2, as shown in FIG. 7. Similarly, the rotation connection members 11 are arranged such that the rotation shafts of the rotation connection members 11 are separated from each other by, for example, 2 mm in the sliding direction of the housings 1 and 2. The positions at which the rail parts 4 are provided are also separated from each other by 2 mm in the sliding direction of the housings 1 and 2 in accordance with the distance (2 mm) by which the rotation shafts are separated from each other.

Accordingly, the movable ranges of the arm parts 9 include suitable allowances in the operation for setting the housings 1 and 2 to the open state, and the housings 1 and 2 can smoothly slide to the positions corresponding to the open state.

Assembly Process

An assembly process of the mobile phone having the above-described structure will now be described.

First, each rotation connection member 11 on which the first spring member 14 is fitted is inserted through the second connection hole 17 that is formed in the corresponding arm part 9 at a position near the end portion 9b thereof, and is attached to the arm part 9 together with the retaining washer 24. At this time, one end of the first spring member 14 is engaged in advance with the projection provided on the back surface of the arm part 9 (at the side where the rotation connection member 11 is provided). As described above, the rotation connection member 11 has a substantially columnar shape. Therefore, the arm part 9 is rotatably attached to the rotation connection member 11.

Next, as shown in FIG. 5, the end portion 9a of each arm part 9 that is provided with the cut section 19 is covered with the slide cover 20. In this state, the end portion 9a of the arm part 9 is inserted into the groove 6 in the corresponding rail part 4 on the rail plate 5 shown in FIG. 3. Thus, a communication hole is formed which extends though the slide hole 7 that is formed in the outer wall portion 4a of the rail part 4 so as to extend in the longitudinal direction thereof, the first connection hole 16 that is formed in the arm part 9, and the slide hole 8 that is formed in the inner wall portion 4b of the rail part 4 so as to extend in the longitudinal direction thereof.

A hole that communicates with the above-described communication hole is formed in the main assisting body 18 of the slide assisting member 12 shown in FIG. 5 at a position near the end portion 18a of the main assisting body 18. The end portion 18a of the main assisting body 18 of the slide assisting member 12 is brought into contact with the inner wall portion 4b of the rail part 4 such that the hole that is formed in the main assisting body 18 at the position near the end portion 18a communicates with the above-described communication hole.

Then, the connection plate 13 is placed between the rail parts 4 such that, at each side of the connection plate 13, the hole that is formed in the main assisting body 18 of the slide assisting member 12 at the position near the end portion 18a communicates with the arm connection hole 25a in the connection plate 13.

In this state, at each side of the connection plate 13, the rotation-slide connection member 10 having a substantially columnar shape is inserted through the arm connection hole 25a in the connection plate 13, the hole formed in the main assisting body 18 at the position near the end portion 18a, and the above-described communication hole, and the retaining washer 23 is attached to an end portion of the rotation-slide connection member 10 that projects from the outer wall portion 4a of the rail part 4. Thus, the end portion 9a of each arm part 9 is attached to the rail part 4 in a slidable and rotatable manner. In addition, the connection plate 13 is connected to the end portion 9a of each arm part 9.

Another hole that communicates with the above-described communication hole is formed in the main assisting body 18 of each slide assisting member 12 at a position near the end portion 18b of the main assisting body 18. Accordingly, the end portion 18b of the main assisting body 18 of each slide assisting member 12 is brought into contact with the inner wall portion 4b of the corresponding rail part 4 such that the hole formed in the main assisting body 18 at a position near the end portion 18b communicates with the above-described communication hole.

Then, the connection plate 13, which is connected to the end portion 9a of each arm part 9, is placed such that, at each side of the connection plate 13, the hole formed in the main assisting body 18 at the position near the end portion 18b communicates with the slide-assisting-member connection hole 25b in the connection plate 13.

In this state, the guide shaft 21 having a substantially cylindrical shape is inserted through the slide holes 7 and 8 in each rail part 4, and a retaining pin 27 shown in FIG. 5 is inserted into a hole at the center of the guide shaft 21 through the slide-assisting-member connection hole 25b in the connection plate 13 and the hole formed in the main assisting body 18 at the position near the end portion 18b. Accordingly, an end portion 27a of the retaining pin 27 projects from the outer wall portion 4a of each rail part 4. Then, the retaining washer 22 is attached to the end portion 27a of the retaining pin 27. Thus, owing to the guide shaft 21 inserted through the slide holes 7 and 8 in each rail part 4, the slide assisting members 12 are slidable along the rail parts 4. In addition, the connection plate 13 is connected to the slide assisting members 12.

Next, the other end of the first spring member 14 provided on each rotation connection member 11 is fixed to the second housing 2 such that the arm parts 9 are urged in the direction for setting the housings 1 and 2 to the closed state.

Then, the second spring members 15 are connected to the respective spring retaining holes 26 formed in the connection plate 13 as shown in FIG. 6 at one thereof, and are connected to the first housing 1 at the other end thereof. Accordingly, the urging force of the second spring members 15 is transmitted to the arm parts 9 through the connection plate 13 and the slide assisting members 12, and the arm parts 9 are urged in the direction for setting the housings 1 and 2 to the closed state.

As described below, when the rotational position of each arm part 9 corresponds to the closed state of the housings 1 and 2, the urging force of the second spring members 15 is transmitted to the arm parts 9 as an urging force for setting the housings 1 and 2 to the closed state. When the rotational position of each arm part 9 corresponds to the open state of the housings 1 and 2, the urging force of the second spring members 15 is transmitted to the arm parts 9 as an urging force for setting the housings 1 and 2 to the open state. More specifically, the direction in which the urging force of the second spring members 15 is applied to the arm parts 9 is changed (reversed) between the direction for setting the housings 1 and 2 to the closed state and the direction for setting the housings 1 and 2 to the open state in accordance with the rotational position of each arm part 9.

Sliding Operation of Mobile Phone of First Embodiment

Next, a sliding operation of the mobile phone according to the present embodiment having the above-described structure will now be described.

Sliding Operation of Housings from Closed State to Open State

A sliding operation of the housings 1 and 2 from the closed state shown in FIG. 1 to the open state shown in FIG. 2 will now be described. When the housings 1 and 2 are in the closed state, as shown in FIG. 1, the housings 1 and 2 substantially entirely overlap so that the keyboard provided on the second housing 2 is covered by the first housing 1.

In this state, a force in an opening direction shown in FIG. 1 is applied to the first housing 1 along a short-side direction thereof, and a force in a closing direction shown in FIG. 1 is applied to the second housing 2 along a short-side direction thereof. Accordingly, each arm part 9 starts to slide along the groove 6 (see FIG. 3) in the corresponding rail part 4. Then, if the above-described forces in the respective directions are continuously applied to the housings 1 and 2, the end portion 9a of each arm part 9 comes into contact with a terminal end portion 4d of the corresponding rail part 4.

Figure 8:
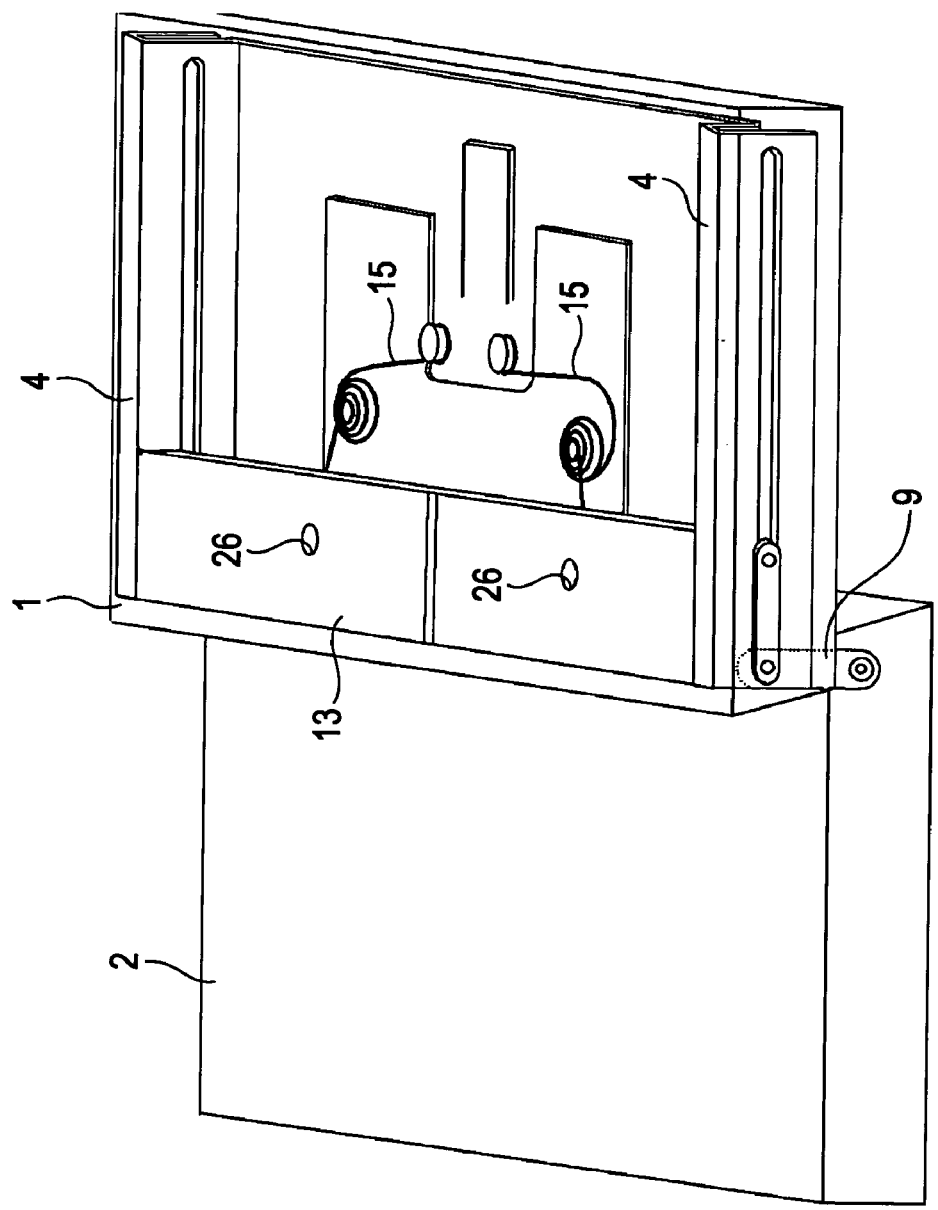
FIG. 8 is a see-through perspective view of the mobile phone according to the first embodiment in an intermediate state between the closed state and the open state viewed from the right side.

As described above, the arm parts 9 are urged in the closing direction shown in FIG. 1 by the first spring members 14 and the second spring members 15. However, if the above-described forces in the respective directions are continuously applied to the housings 1 and 2 while the end portion 9a of each arm part 9 is in contact with the terminal end portion 4d of the corresponding rail part 4, each arm part 9 starts to rotate around the rotation shafts of the corresponding rotation-slide connection member 10 and the corresponding rotation connection member 11 against the urging force in the closing direction. Accordingly, a state (intermediate state) in which the first housing 1 is lifted by each arm part 9, as shown in FIG. 8, is obtained.

As described above, when each arm part 9 is at the rotational position corresponding to the closed state of the housings 1 and 2, the urging force of the second spring members 15 is transmitted to the arm parts 9 through the slide assisting members 12 and the connection plate 13 as an urging force for setting the housings 1 and 2 to the closed state. If the above-described forces in the respective directions are applied to the housings 1 and 2 in the intermediate state shown in FIG. 8 in which the first housing 1 is lifted by each arm part 9, each arm part 9 is rotated in the direction for opening the housings 1 and 2. When each arm part 9 is rotated in the in the direction for opening the housings 1 and 2, the urging force of the second spring members 15, which has been transmitted to the arm parts 9 as an urging force for setting the housings 1 and 2 to the closed state, is transmitted to the arm parts 9 as an urging force for setting the housings 1 and 2 to the open state through the slide assisting members 12 and the connection plate 13.

More specifically, the urging force of the second spring members 15 transmitted to the arm parts 9 through the slide assisting members 12 and the connection plate 13 serves as an urging force for setting the housings 1 and 2 to the closed state while each arm part 9 is at the rotational position corresponding to the closed state of the housings 1 and 2. However, as the state of the housings 1 and 2 changes from the intermediate state to the open state, the rotational position of each arm part 9 changes from the rotational position corresponding to the intermediate state to the rotational position corresponding to the open state. In response to the change in the rotational position of the arm part 9, the urging force of the second spring members 15 transmitted to the arm parts 9 changes from the urging force for setting the housings 1 and 2 to the closed state to the urging force for setting the housings 1 and 2 to the open state.

When the urging force of the second spring members 15 transmitted to the arm parts 9 is changed from the urging force for setting the housings 1 and 2 to the closed state to the urging force for setting the housings 1 and 2 to the open state, each arm part 9 is automatically rotated by the urging force of the second spring members 15 in the direction for setting the housings 1 and 2 to the open state. In response to the rotation of each arm part 9, the first housing 1 is automatically moved in the opening direction by the rail plate 5 and other components. As a result, the mobile phone is set to the open state in which the display unit provided on the first housing 1 and the keyboard provided on the second housing 2 are positioned on the same plane.

According to this mobile phone, when the housings 1 and 2 are in the open state, the display unit provided on the first housing 1 and the keyboard provided on the second housing 2 can be positioned on the same plane. Therefore, the area in which the housings 1 and 2 overlap can be eliminated and the entire area of the exposing surface of the second housing 2 can be used as an area in which the keyboard can be disposed.

Since the entire area of the exposing surface of the second housing 2 can be used as an area in which the keyboard can be disposed, the area of the input operation surface of the keyboard can be increased. Therefore, intervals between keys included in the keyboard can be increased, and the input operation can be facilitated accordingly.

In addition, since the area of the input operation surface of the keyboard can be increased, keys that are physically larger than those in the structure of the related art can be provided on the keyboard. This also facilitates the input operation.

In addition, since the area of the input operation surface of the keyboard can be increased, a larger number of keys can be provided on the keyboard compared to the structure of the related art.

Sliding Operation of Housings from Open State to Closed State

A sliding operation of the housings 1 and 2 from the open state shown in FIG. 2 to the closed state shown in FIG. 1 will now be described.

In this case, in the open state shown in FIG. 2, a force in a direction for lifting the first housing 1 and a force in the closing direction shown in FIG. 1 are applied to the first housing 1. When the force in the direction for lifting the first housing 1 and the force in the closing direction are applied to the first housing 1, each arm part 9 starts to rotate around the rotation-slide connection member 10 and the rotation connection member 11 in a direction along the direction of the above-described urging force for closing the housings 1 and 2. Accordingly, the intermediate state shown in FIG. 8 in which the first housing 1 is lifted by each arm part 9 is obtained.

As described above, when each arm part 9 is at the rotational position corresponding to the open state of the housings 1 and 2, the urging force of the second spring members 15 is transmitted to the arm parts 9 through the slide assisting members 12 and the connection plate 13 as an urging force for setting the housings 1 and 2 to the open state. If the force in the closing direction is applied to the first housing 1 and the force in the opening direction is applied to the second housing 2 in the intermediate state shown in FIG. 8 in which the first housing 1 is lifted by each arm part 9, each arm part 9 is rotated in the direction for closing the housings 1 and 2. When each arm part 9 is rotated in the in the direction for closing the housings 1 and 2, the urging force of the second spring members 15, which has been transmitted to the arm parts 9 as an urging force for setting the housings 1 and 2 to the open state, is transmitted to the arm parts 9 as an urging force for setting the housings 1 and 2 to the closed state through the slide assisting members 12 and the connection plate 13.

More specifically, the urging force of the second spring members 15 transmitted to the arm parts 9 through the slide assisting members 12 and the connection plate 13 serves as an urging force for setting the housings 1 and 2 to the open state while each arm part 9 is at the rotational position corresponding to the open state of the housings 1 and 2. However, as the state of the housings 1 and 2 changes from the intermediate state to the closed state, the rotational position of each arm part 9 changes from the rotational position corresponding to the intermediate state to the rotational position corresponding to the closed state. In response to the change in the rotational position of the arm part 9, the urging force of the second spring members 15 transmitted to the arm parts 9 changes from the urging force for setting the housings 1 and 2 to the open state to the urging force for setting the housings 1 and 2 to the closed state.

When the urging force of the second spring members 15 transmitted to the arm parts 9 is changed from the urging force for setting the housings 1 and 2 to the open state to the urging force for setting the housings 1 and 2 to the closed state, each arm part 9 is automatically rotated by the urging force of the second spring members 15 in the direction for setting the housings 1 and 2 to the closed state. In response to the rotation of each arm part 9, the first housing 1 is automatically moved in the closing direction by the rail plate 5 and other components. As a result, the mobile phone is set to the closed state in which the housings 1 and 2 substantially entirely overlap.

Effects of First Embodiment

As is clear from the above-described explanations, in the mobile phone according to the first embodiment, the display unit provided on the first housing 1 and the keyboard provided on the second housing 2 are positioned on the same plane when the housings 1 and 2 are in the open state. Therefore, when the housings 1 and 2 are in the open state, the area in which the housings 1 and 2 overlap is eliminated and the entire area of the exposing surface of the second housing 2 can be used as an area in which the keyboard can be disposed.

Since the entire area of the exposing surface of the second housing 2 can be used as an area in which the keyboard can be disposed, the area of the input operation surface of the keyboard can be increased. Therefore, intervals between keys included in the keyboard can be increased, and the input operation can be facilitated accordingly.

In addition, since the area of the input operation surface of the keyboard can be increased, keys that are physically larger than those in the structure of the related art can be provided on the keyboard. This also facilitates the input operation.

In addition, since the area of the input operation surface of the keyboard can be increased, a larger number of keys can be provided on the keyboard compared to the structure of the related art.

Second Embodiment

A mobile phone according to a second embodiment of the present invention will now be described. In the mobile phone according to the first embodiment, the state of the housings 1 and 2 can be switched between two states, that is, the closed state and the open state. In the mobile phone according to the second embodiment, the housings 1 and 2 can be set to a state shown in FIG. 9 (hereinafter referred to as an intermediate standing state) in which the first housing 1 stands obliquely on the second housing 2 before the state of the housings 1 and 2 is changed from the closed state to the open state.

The structure and operation that allow the housings 1 and 2 to be set to the intermediate standing state are the only differences between the first embodiment and the second embodiment. Therefore, only the structure and operation that allow the housings 1 and 2 to be set to the intermediate standing state will be explained in the description of the second embodiment, and explanations similar to those in the first embodiment will be omitted.

Structure of Mobile Phone of Second Embodiment

Figure 10:
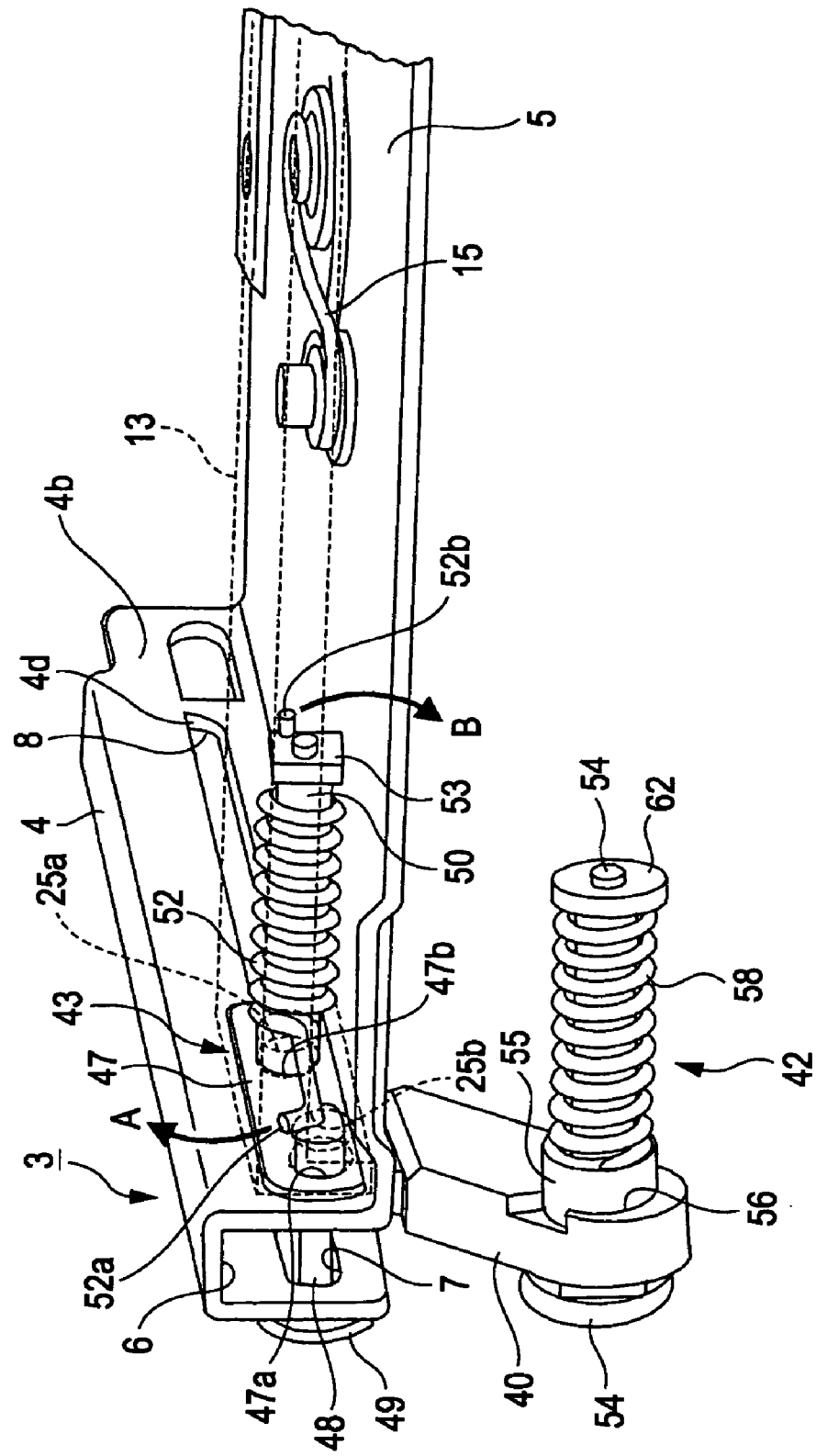
FIG. 10 is an enlarged perspective view of the main part of the mobile phone according to the second embodiment.
Figure 11:
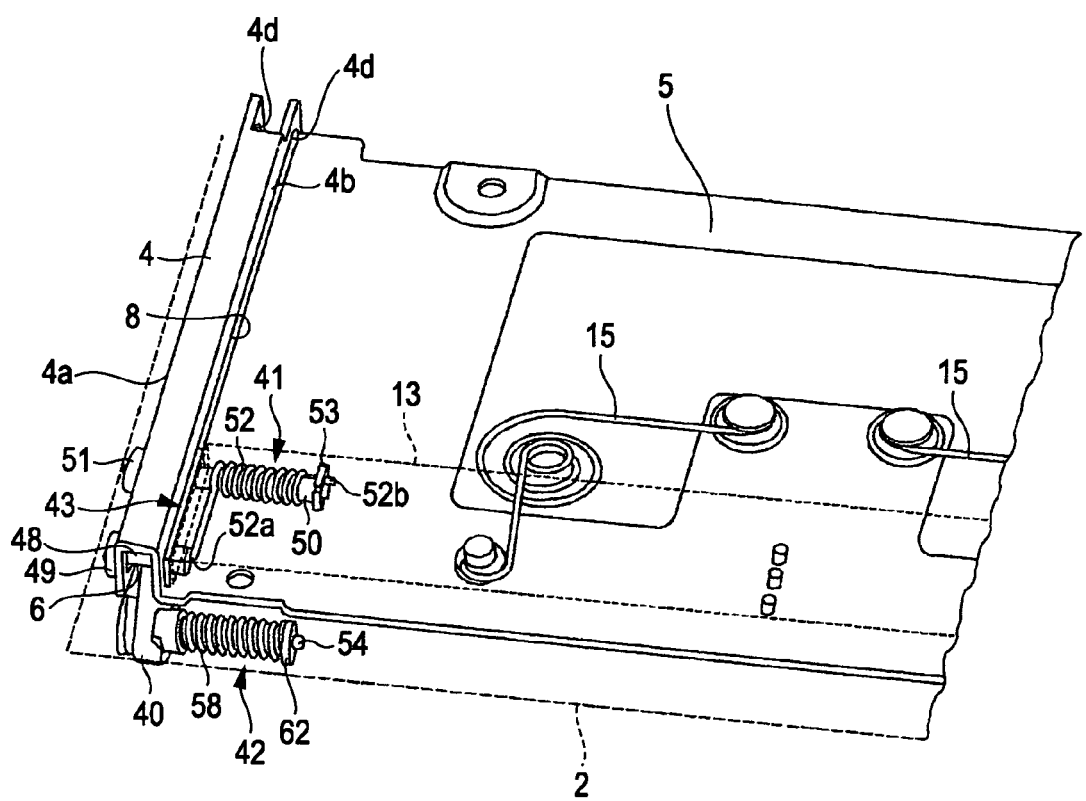
FIG. 11 is a perspective view of the main part of the mobile phone according to the second embodiment.

FIGS. 10 and 11 are perspective views of the main part of the mobile phone according to the second embodiment. FIG. 11 is an enlarged perspective view of the main part viewed in a direction different from a direction in which the main part is viewed in FIG. 10. As is clear from FIGS. 10 and 11, in the mobile phone according to the second embodiment, the slide holding mechanism 3, which holds the housings 1 and 2 such that the housings 1 and 2 can slide along each other in short-side directions thereof, includes the rail plate 5 on which the pair of rail parts 4 are formed and a pair of arm parts 40. Each arm part 40 is slidably and rotatably connected to the corresponding rail part 4 on the rail plate 5 at one end thereof and is rotatably connected to the second housing 2 at the other end thereof.

The slide holding mechanism 3 also includes a pair of rotation-slide connection members 41 and a pair of rotation connection members 42. Each rotation-slide connection member 41 includes a rotation shaft that extends perpendicular to the sliding directions of the housings 1 and 2 and connects one end of each arm part 40 to the corresponding rail part 4 in a slidable and rotatable manner. Each rotation connection member 42 includes a rotation shaft that extends perpendicular to the sliding directions of the housings 1 and 2 and connects the other end of each arm part 40 to the second housing 2 in a rotatable manner.

The slide holding mechanism 3 also includes a pair of slide assisting members 43 which serve to stabilize the sliding movements of the housings 1 and 2 and a connection plate 13. The connection plate 13 connects the rotation-slide connection members 41 to each other without changing the slidable and rotatable state of the arm parts 40, and also connects the slide assisting members 43 to each other without changing the slidable state thereof.

The slide holding mechanism 3 also includes the second spring members 15 that are connected to the connection plate 13 at one end thereof and to the first housing 1 at the other end thereof. As described in the first embodiment, the second spring members 15 apply an urging force to the housings 1 and 2 in the closing direction or the opening direction in accordance with the rotational position of each arm part 40.

Figure 12:
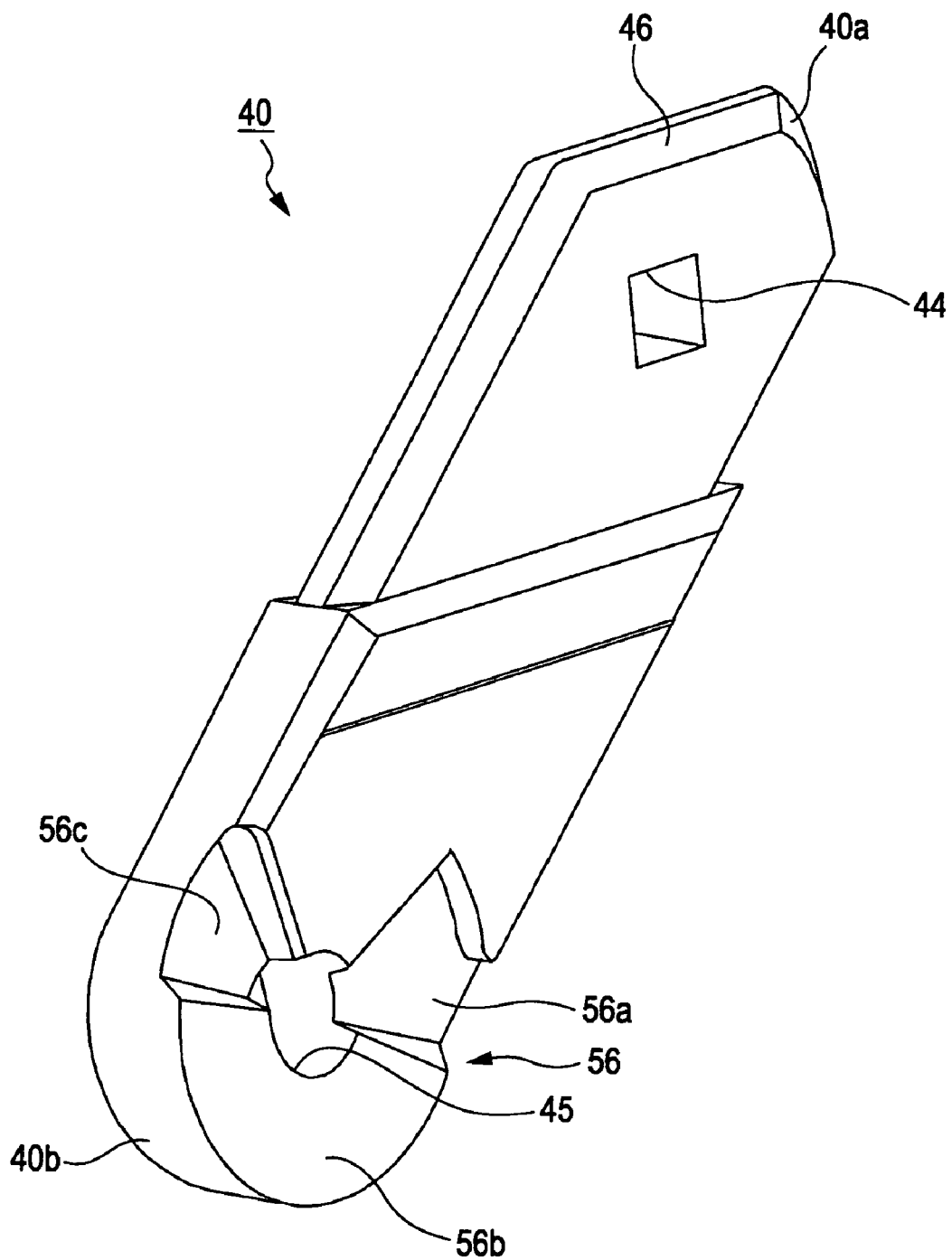
FIG. 12 is a perspective view of an arm part that connects first and second housings to each other in a slidable manner in the mobile phone according to the second embodiment.

As shown in FIG. 12, each arm part 40 has a substantially elliptical plate shape, and a first connection hole 44 for connecting the arm part 40 to the corresponding rail part 4 is formed at a position near one end portion 40*a* of the arm part 40 so as to extend through the arm part 40 in a direction perpendicular to the longitudinal direction thereof. In addition, a second connection hole 45 for connecting the arm part 40 to the second housing 2 is formed at a position near the other end portion 40*b* of the arm part 40 so as to extend through the arm part 40 in the direction perpendicular to the longitudinal direction thereof. In addition, the end portion 40*a* of each arm part 40 is provided with a cut section 46 that is cut so that the end portion 40*a* can be brought into line contact with the upper wall portion 4*c* (see FIG. 3) of the corresponding rail part 4.

Each arm part 40 is provided with a cam surface 56 that can be fitted to a cam member (denoted by 55 in FIGS. 10 and 14), which will be described below, at a position near the end portion 40b. The cam surface 56 includes a first recessed portion 56a at a position corresponding to the rotational position of each arm part 40 for when the housings 1 and 2 are in the closed state or the intermediate standing state. The cam surface 56 also includes a second recessed portion 56c at a position corresponding to the rotational position of each arm part 40 for when the housings 1 and 2 are in the open state. A projecting portion 56b is provided between the first recessed portion 56a and the second recessed portion 56c in the cam surface 56.

As described below, a clicking sound and a clicking feeling are generated by an urging force of a spring member (denoted by 58 in FIG. 10) when the cam member (denoted by 55 in FIGS. 10 and 14) is fitted to one of the recessed portions 56a and 56c.

Although not shown in FIGS. 10 to 12, a slide cover that is similar to the above-described slide cover (denoted by 20 in FIG. 5) and that has a shape corresponding to the shape of the cut section 46 is provided at the end portion 40a of each arm part 40 so as to cover the end portion 40a. As described above, the slide cover serves to reduce friction so that the end portion 40a of the arm part 40 can slide along the rail part 4 with a low friction.

Each slide assisting member 43 includes a main assisting body 47 having a rectangular plate shape and a guide shaft 48 provided so as to project from the main assisting body 47 in a direction perpendicular to the longitudinal direction of the main assisting body 47. The main assisting body 47 is provided with a hole 47a for receiving the above-described guide shaft 48 and a hole 47b for receiving a shaft member of 50 of the corresponding rotation-slide connection member 41. The holes 47a and 47b are separated from each other by a predetermined distance in the longitudinal direction of the main assisting body 47.

The guide shaft 48 is inserted through the slide holes 7 and 8 in the corresponding rail part 4, the hole 47a in the main assisting body 47, and the slide-assisting-member connection hole 25b in the connection plate 13 shown in FIG. 6 at each side of the connection plate 13. In this state, the guide shaft 48 is fixed at a position near the hole 47a in the main assisting body 47 together with a retaining washer 49. The guide shaft 48 serves to guide the movement of the main assisting body 47 along the corresponding rail part 4.

As is clear from FIGS. 10 and 11, each rotation-slide connection member 41 includes a shaft member 50 having a substantially columnar shape. The shaft member 50 is inserted through the slide hole 7 in the corresponding rail part 4, the first connection hole 44 in the corresponding arm part 40, the slide hole 8 in the rail part 4, the hole 47b in the main assisting body 47 of the corresponding slide assisting member 43, and the arm connection hole 25a, and is provided with a retaining washer 51 (see FIG. 11). Thus, the rotation-slide connection member 41 holds the arm part 40 such that the arm part 40 is rotatable and slidable along the rail part 4, and also holds the slide assisting member 43 such that the slide assisting member 43 is slidable along the rail part 4.

In addition, the shaft member 50 of each rotation-slide connection member 41 is provided with a third spring member 52 that is wound around the shaft member 50 along a circumferential direction thereof, and a retaining washer 53 is provided to prevent the third spring member 52 from falling off. The third spring member 52 is provided on the shaft member 50 such that the urging direction of the third spring member 52 is set to the direction shown by arrow A in FIG. 10 (direction away from the second housing 2) at an end portion 52a and to the direction shown by arrow B in FIG. 10 (direction toward the second housing 2) at the other end portion 52b.

The end portion 52b of each third spring member 52 is engaged with the retaining washer 53, as shown in FIG. 11. The end portion 52a of each third spring member 52 is provided such that the end portion 52a is pressed by the connection plate 13 which connects the slide assisting members 43 to each other.

As described above, the urging direction at the end portion 52a of each third spring member 52 is a direction opposite to the direction toward the second housing 2 (direction away from the second housing 2). Since the third spring member 52 is provided on each rotation-slide connection member 41 such that the end portion 52a is pressed by the connection plate 13, the urging force of the third spring member 52 at the end portion 52a thereof is transmitted to the rail plate 5 through the connection plate 13 and each slide assisting member 43. Accordingly, in the state in which the housings 1 and 2 overlap in the closed state, the first housing 1 is urged by the rail plate 5 in a direction in which the distance between the housings 1 and 2 is reduced.

Figure 13:
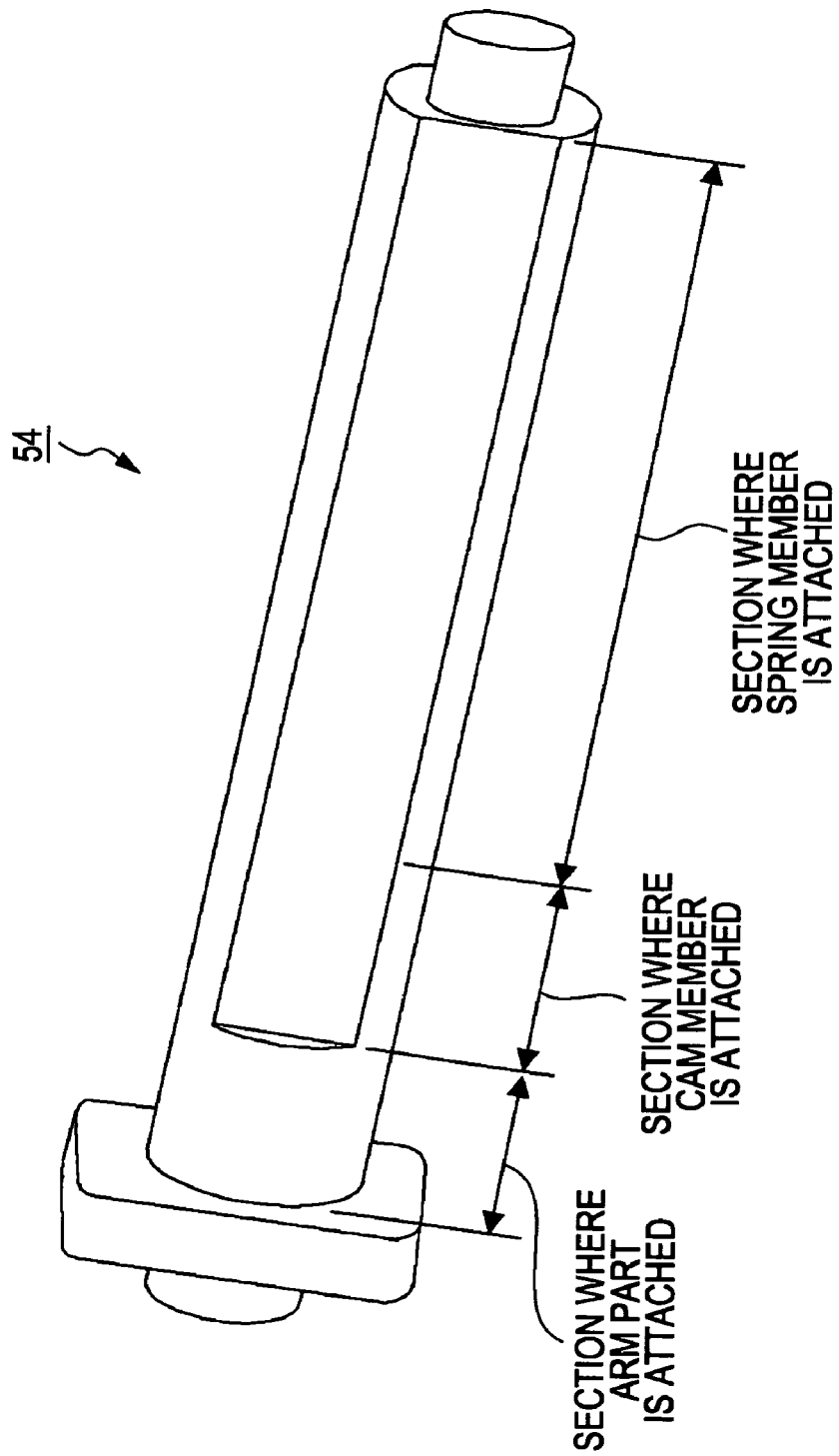
FIG. 13 is a perspective view of a shaft member of a rotation connection member included in the mobile phone according to the second embodiment.

Each rotation connection member 42 includes a shaft member 54 having a substantially columnar shape, the cam member 55 fixed to the shaft member 54 such that the cam member 55 does not rotate along the circumferential direction of the shaft member 54, and the spring member 58 that urges the cam member 55 toward the cam surface 56 of the corresponding arm part 40 (see FIG. 12). Referring to FIG. 13, a section of the shaft member 54 at which the arm part 40 is attached is subjected to a process for making the peripheral surface thereof smooth so that the arm part 40 can smoothly rotate along the circumferential direction of the shaft member 54.

In contrast, sections of the shaft member 54 at which the cam member 55 (and the spring member 58) are attached are processed such that the cross section of the shaft member 54 in the radial direction thereof has an irregular shape. Accordingly, the cam member 55 is restrained from rotating in the circumferential direction of the shaft member 54.

Figure 14:
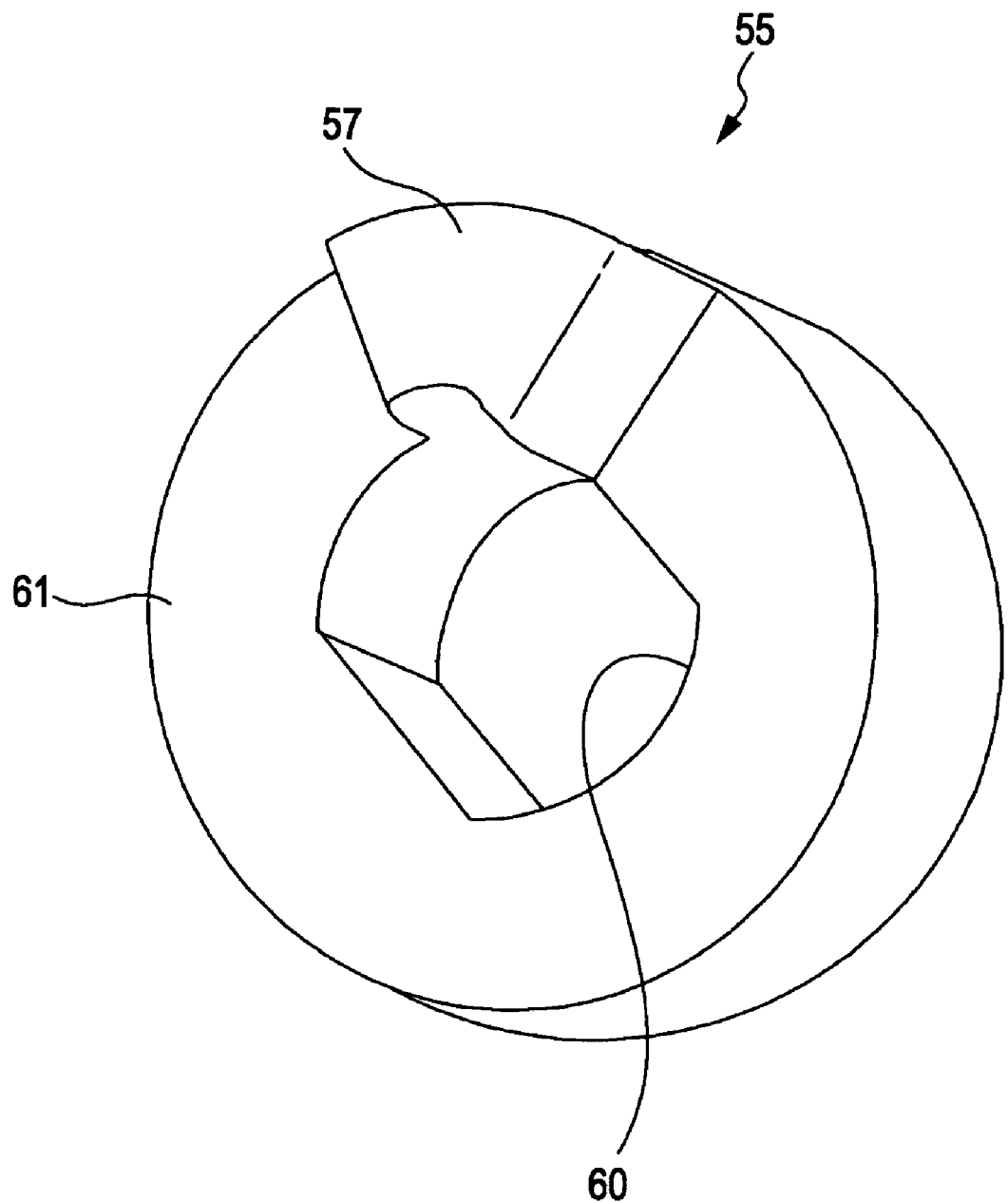
FIG. 14 is a perspective view of a cam member fitted to a cam surface of the arm part in the mobile phone according to the second embodiment.

As shown in FIG. 14, the cam member 55 has a disk-like shape with a predetermined thickness. A surface of the cam member 55 at one side thereof serves as a cam surface 61 that faces the cam surface 56 of the corresponding arm part 40. In addition, the cam member 55 includes a fitting projection 57 that projects from a part of the cam surface 61 in a direction perpendicular to the radial direction of the cam member 55. The fitting projection 57 is fitted to the first recessed portion 56a formed in the cam surface 56 of the arm part 40 when the housings 1 and 2 are in the closed state, and is fitted to the second recessed portion 56c formed in the cam surface 56 of the arm part 40 when the housings 1 and 2 are in the open state.

In addition, the cam member 55 has a shaft insertion hole 60 for receiving the shaft member 54 shown in FIG. 13. As described above, the section of the shaft member 54 at which the cam member 55 is attached is processed such that the cross section of the shaft member 54 in the radial direction thereof has an irregular shape. Therefore, the shaft insertion hole 60 also has an irregular shape that matches the irregular shape of the shaft member 54.

As shown in FIGS. 10 and 11, the shaft member 54 of each rotation connection member 42 is inserted through the second connection hole 45 in the corresponding arm part 40 from the side of the arm part 40 that is opposite to the cam surface 56, and the cam member 55 is attached to the shaft member 54 such that the cam surface 56 of the arm part 40 and the cam surface 61 of the cam member 55 face each other. Then, the spring member 58 is attached to the shaft member 54 such that the cam member 55 is urged against the cam surface 56 of the arm part 40, and a retaining washer 62 is attached to the shaft member 54 at an end opposite to the cam surfaces.

The shaft member 54 of each rotation connection member 42 is fixed to the second housing 2 at an end opposite to the end at which the retaining washer 62 is attached. Thus, the rotation connection member 42 is provided in the second housing 2 such that the shaft member 54 is not rotatable.

As described above, the shaft member 54 is disposed in the second housing 2 such that the shaft member 54 is not rotatable. However, as described above with reference to FIG. 13, the section of the shaft member 54 at which the arm part 40 is attached is subjected to a process for making the peripheral surface thereof smooth, and the section of the shaft member 54 at which the cam member 55 is attached is processed such that the cross section thereof has an irregular shape. In addition, the second connection hole 45 in the arm part 40 is subjected to a process for making the inner surface thereof smooth, and the shaft insertion hole 60 in the cam member 55 is formed in an irregular shape that matches the irregular shape of the shaft member 54. Therefore, the cam member 55 does not rotate along the circumferential direction of the shaft member 54, which is disposed in the second housing 2 in a non-rotatable manner, with respect to the shaft member 54 and only the arm part 40 rotates along the circumferential direction of the shaft member 54.

Also in the mobile phone according to the second embodiment, as shown in FIG. 7, the rotation shafts of the rotation-slide connection members 41 and the rotation shafts of the rotation connection members 42 are separated from each other by, for example, 2 mm in the sliding direction of the housings 1 and 2. In addition, the positions at which the rail parts 4 are provided are also separated from each other by 2 mm in the sliding direction of the housings 1 and 2. Accordingly, the movable ranges of the arm parts 40 include suitable allowances in the operation for setting the housings 1 and 2 to the open state, and the housings 1 and 2 can smoothly slide between the positions corresponding to the open state and the positions corresponding to the closed state.

Sliding Operation of Mobile Phone of Second Embodiment

Next, a sliding operation of the mobile phone according to the second embodiment having the above-described structure will now be described. The mobile phone according to the first embodiment can be switched between two states, that is, the closed state of the housings 1 and 2 and the open state of the housings 1 and 2. In contrast, the mobile phone according to the second embodiment can be switched between three states, that is, the closed state of the housings 1 and 2, the intermediate standing state shown in FIG. 9, which is an intermediate state between the closed state and the open state of the housings 1 and 2, and the open state of the housings 1 and 2.

Sliding Operation of Housings from Closed State to Intermediate Standing State

A sliding operation of the housings 1 and 2 from the closed state shown in FIG. 1 to the intermediate standing state shown in FIG. 9 will now be described. When the housings 1 and 2 are in the closed state, as shown in FIG. 1, the housings 1 and 2 substantially entirely overlap so that the keyboard provided on the second housing 2 is covered by the first housing 1.

In this state, a force in the opening direction shown in FIG. 1 is applied to the first housing 1 along a short-side direction thereof, and a force in the closing direction shown in FIG. 1 is applied to the second housing 2 along a short-side direction thereof. Accordingly, each arm part 40 starts to slide along the groove 6 (see FIGS. 10 and 11) in the corresponding rail part 4. Then, if the above-described forces in the respective directions are continuously applied to the housings 1 and 2, the end portion 40a (see FIG. 12) of each arm part 40 comes into contact with the terminal end portion 4d of the corresponding rail part 4.

As described above, the end portion 52a of each third spring member 52 is pressed by the connection plate 13. Therefore, the urging force of the third spring member 52 at the end portion 52a thereof is transmitted to the rail plate 5 through the connection plate 13 and each slide assisting member 43. Accordingly, in the state in which the housings 1 and 2 overlap in the closed state, the first housing 1 is urged by the rail plate 5 in a direction in which the distance between the housings 1 and 2 is reduced.

Therefore, in the state in which the end portion 40a of each arm part 40 is in contact with the terminal end portion 4d of the corresponding rail part 4 and the area in which the housings 1 and 2 overlap is smaller than that in the closed state, the urging force of each third spring member 52 at the end portion 52a thereof (that is, the urging force in a direction in which the distance between the housings 1 and 2 is reduced) is applied to the rail plate 5 at an area near the terminal end portion 4d of each rail part 4. At this time, since the area in which the housings 1 and 2 overlap is small, the state in which the first housing 1 stands obliquely on the second housing 2 as shown in FIG. 9 is obtained.

While the housings 1 and 2 are in the closed state, the connection plate 13, each rotation-slide connection member 41, and each slide assisting member 43, which apply the urging force of the third spring member 52 at the end portion 52a thereof to the first housing 1, are positioned near a starting end of each rail part 4 that is opposite to the terminal end portion 4d thereof. Therefore, the urging force of each third spring member 52 at the end portion 52a thereof is applied from the entire body of the first housing 1 to the entire body of the second housing 2. However, when the end portion 40a of each arm part 40 is in contact with the terminal end portion 4d of the corresponding rail part 4, the urging force of each third spring member 52 at the end portion 52a thereof is applied only to the small area in which the housings 1 and 2 overlap.

In other words, the urging force is applied to the first housing 1 such that a portion of the first housing 1 around the terminal end portion 4d of each rail part 4 is pushed against the second housing 2. Accordingly, the mobile phone is switched to the intermediate standing state in which the first housing 1 stands obliquely on the second housing 2.

Thus, the mobile phone according to the second embodiment can set the housings 1 and 2 to the intermediate standing state in which the first housing 1 stands obliquely on the second housing 2. Therefore, a user can easily view the display unit provided on the first housing 1 while operating the keyboard provided on the second housing 2. In addition, a television program, a video content, etc., displayed on the display unit provided on the first housing 1 can be easily viewed while the mobile phone is placed on a desk or the like.

Figure 9:
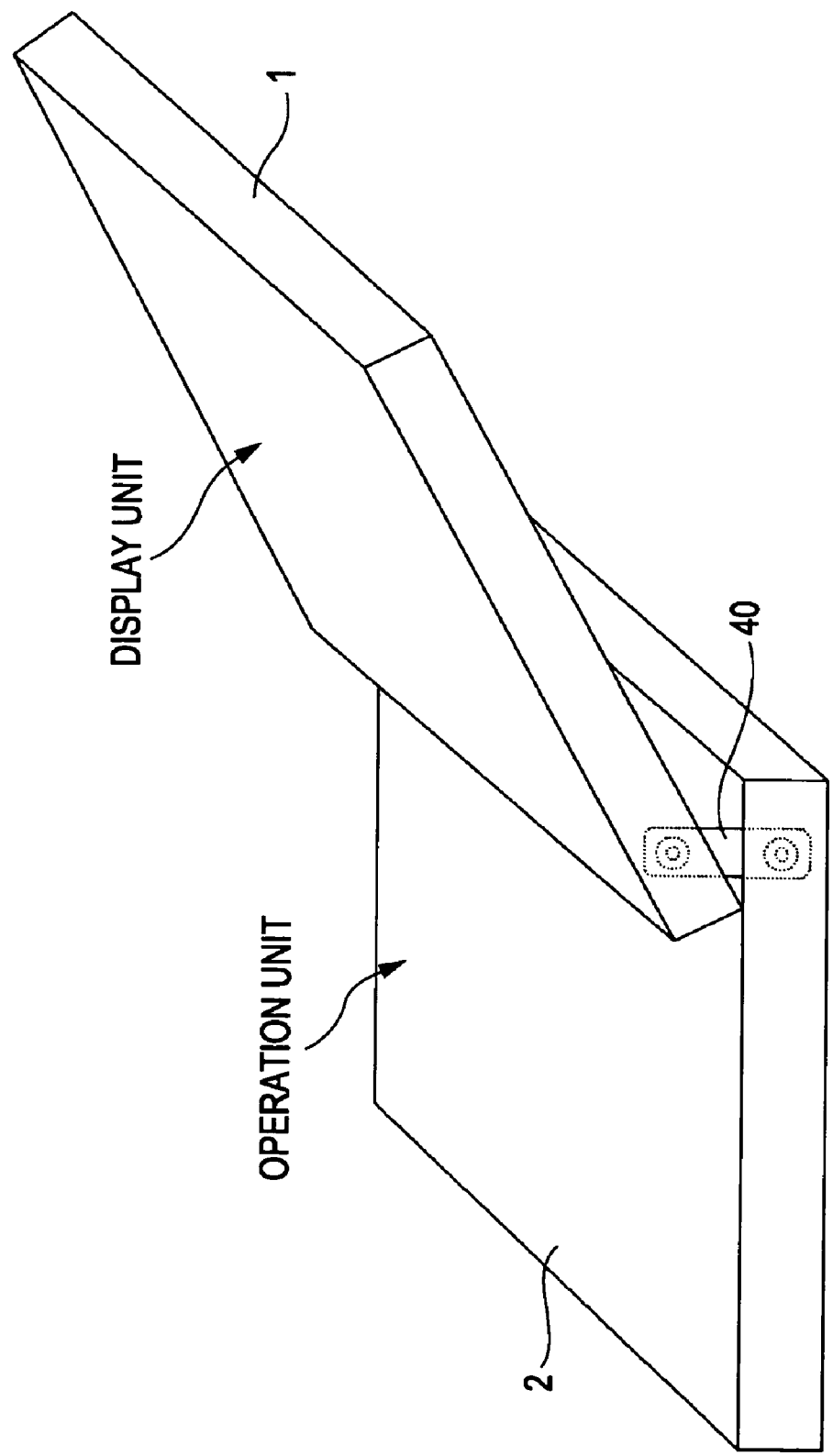
FIG. 9 is a perspective view of a mobile phone according to a second embodiment in an intermediate standing state.

As shown in FIG. 9, the rotational position of the arm part 40 for when the housings 1 and 2 are in the intermediate standing state is the same as the rotational position thereof for when the housings 1 and 2 are in the closed state.

Sliding Operation of Housings from Intermediate Standing State to Open State

As described above, when each arm part 40 is at the rotational position corresponding to the closed state or the intermediate standing state of the housings 1 and 2, the urging force of the second spring members 15 is transmitted to the arm parts 40 through the connection plate 13 and the slide assisting members 43 as an urging force for setting the housings 1 and 2 to the closed state. However, if the above-described forces in the respective directions are applied to the housings 1 and 2 while the housings 1 and 2 are in the above-described intermediate standing state and the end portion 40a of each arm part 40 is in contact with the terminal end portion 4d of the corresponding rail part 4, each arm part 40 starts to rotate around the rotation shafts of the rotation-slide connection member 41 and the rotation connection member 42 against the urging force for setting the housings 1 and 2 to the closed state. Accordingly, the state shown in FIG. 8 in which the first housing 1 is lifted by each arm part 40 is obtained.

Then, if the above-described forces in the respective directions are continuously applied to the housings 1 and 2 in the state in which the first housing 1 is lifted by each arm part 40, each arm part 40 is further rotated in the direction for opening the housings 1 and 2. When each arm part 40 is rotated in the in the direction for opening the housings 1 and 2, the urging force of the second spring members 15, which has been transmitted to the arm parts 40 as an urging force for setting the housings 1 and 2 to the closed state, is transmitted to the arm parts 40 as an urging force for setting the housings 1 and 2 to the open state through the slide assisting members 43 and the connection plate 13.

More specifically, the urging force of the second spring members 15 transmitted to the arm parts 40 through the slide assisting members 43 and the connection plate 13 serves as an urging force for setting the housings 1 and 2 to the closed state while each arm part 40 is at the rotational position corresponding to the closed state and the intermediate standing state of the housings 1 and 2. However, as the state of the housings 1 and 2 changes from the intermediate standing state to the open state, the rotational position of each arm part 40 changes from the rotational position corresponding to the intermediate standing state to the rotational position corresponding to the open state. In response to the change in the rotational position of the arm part 40, the urging force of the second spring members 15 transmitted to the arm parts 40 changes from the urging force for setting the housings 1 and 2 to the closed state to the urging force for setting the housings 1 and 2 to the open state.

When the urging force of the second spring members 15 transmitted to the arm parts 40 is changed from the urging force for setting the housings 1 and 2 to the closed state to the urging force for setting the housings 1 and 2 to the open state, each arm part 40 is automatically rotated by the urging force of the second spring members 15 in the direction for setting the housings 1 and 2 to the open state. In response to the rotation of each arm part 40, the first housing 1 is automatically moved in the opening direction by the rail plate 5 and other components. As a result, the mobile phone is set to the open state in which the display unit provided on the first housing 1 and the keyboard provided on the second housing 2 are positioned on the same plane.

According to this mobile phone, when the housings 1 and 2 are in the open state, the display unit provided on the first housing 1 and the keyboard provided on the second housing 2 can be positioned on the same plane. Therefore, the area in which the housings 1 and 2 overlap can be eliminated and the entire area of the exposing surface of the second housing 2 can be used as an area in which the keyboard can be disposed.

Since the entire area of the exposing surface of the second housing 2 can be used as an area in which the keyboard can be disposed, the area of the input operation surface of the keyboard can be increased. Therefore, intervals between keys included in the keyboard can be increased, and the input operation can be facilitated accordingly.

In addition, since the area of the input operation surface of the keyboard can be increased, keys that are physically larger than those in the structure of the related art can be provided on the keyboard. This also facilitates the input operation.

In addition, since the area of the input operation surface of the keyboard can be increased, a larger number of keys can be provided on the keyboard compared to the structure of the related art.

When each arm part 40 is at the rotational position corresponding to the closed state or the intermediate standing state of the housings 1 and 2, the fitting projection 57 of the cam member 55 is fitted to the first recessed portion 56a in the cam surface 56 of the arm part 40. In addition, the cam member 55 is fixed to the shaft member 54 of the rotation connection member 42, and only the arm part 40 is rotatable.

Therefore, when each arm part 40 rotates in the process of changing the state of the housings 1 and 2 from the closed state or the intermediate standing state to the open state, the fitting projection 57 of the cam member 55 is moved against the urging force of the spring member 58 and is moved onto the projecting portion 56b on the cam surface 56. Thus, the engagement between the fitting projection 57 and the first recessed portion 56a in the cam surface 56 is canceled. Then, when each arm part 40 further rotates and the state of the housings 1 and 2 is changed to the open state, the fitting projection 57 of the cam member 55 is fitted into the second recessed portion 56c in the cam surface 56. At this time, the fitting projection 57 is fitted into the second recessed portion 56c with a certain impact, owing to the urging force of the spring member 58.

Therefore, a clicking sound can be generated at the time when the fitting projection 57 is fitted into the second recessed portion 56c in the cam surface 56, thereby showing the user that the mobile phone has been set to the open state.

In addition, the fitting projection 57 is fitted into the second recessed portion 56c in the cam surface 56 by the urging force of the spring member 58. Therefore, a clicking feeling can also be generated to show the user that the mobile phone has been set to the open state.

In addition, the urging force of the spring member 58 is continuously applied to the fitting projection 57 fitted in the second recessed portion 56c in the cam surface 56. Therefore, the fitting projection 57 can be fitted in the second recessed portion 56c in the cam surface 56 with a relatively large strength in accordance with the urging force of the spring member 58. Therefore, the open state of the housings 1 and 2 can be stably maintained.

Sliding Operation of Housings from Open State to Closed State

A sliding operation of the housings 1 and 2 from the open state shown in FIG. 2 to the closed state shown in FIG. 1 will now be described.

In this case, in the open state shown in FIG. 2, a force in a direction for lifting the first housing 1 and a force in the closing direction shown in FIG. 1 are applied to the first housing 1. When the force in the direction for lifting the first housing 1 and the force in the closing direction are applied to the first housing 1, each arm part 40 starts to rotate around the rotation shafts of the rotation-slide connection member 41 and the rotation connection member 42. Accordingly, the state shown in FIG. 8 in which the first housing 1 is lifted by each arm part 40 is obtained.

As described above, when each arm part 40 is at the rotational position corresponding to the open state of the housings 1 and 2, the urging force of the second spring members 15 is transmitted to the arm parts 40 through the slide assisting members 43 and the connection plate 13 as an urging force for setting the housings 1 and 2 to the open state. If the force in the closing direction is applied to the first housing 1 and the force in the opening direction is applied to the second housing 2 in the state shown in FIG. 8 in which the first housing 1 is lifted by each arm part 40, each arm part 40 is rotated in the direction for closing the housings 1 and 2.

Immediately after each arm part 40 is rotated in the direction for closing the housings 1 and 2 as described above, the housings 1 and 2 are in a state such that edge portions thereof overlap in a small area. Therefore, if the above-described forces applied to the housings 1 and 2 are removed while the housings 1 and 2 are in this state, the urging force of each third spring member 52 at the end portion 52a thereof is applied only in the small area in which the housings 1 and 2 overlap. Therefore, the state of the mobile phone is switched to the intermediate standing state in which the first housing 1 obliquely stands on the second housing 2.

When the mobile phone is set to the intermediate standing state in which each arm part 40 is rotated in the direction for closing the housings 1 and 2, the urging force of the second spring members 15, which has been transmitted to the arm parts 40 as an urging force for setting the housings 1 and 2 to the open state, is transmitted to the arm parts 40 as an urging force for setting the housings 1 and 2 to the closed state through the slide assisting members 43 and the connection plate 13.

In the intermediate standing state in which the first housing 1 obliquely stands on the second housing 2, a force for making the housings 1 and 2 parallel to each other is applied. In addition, a force in the closing direction shown in FIG. 1 is applied to the first housing 1 along the short-side direction thereof and a force in the opening direction shown in FIG. 1 is applied to the second housing 2 along the short-side direction. Accordingly, the first housing 1 is automatically moved in the closing direction along each rail part 4 of the rail plate 5 by the urging force of the second spring members 15 which has been changed to an urging force for setting the housings 1 and 2 to the closed state. As a result, the mobile phone is set to the closed state in which the housings 1 and 2 substantially entirely overlap.

When each arm part 40 is at the rotational position corresponding to the open state, the fitting projection 57 of the cam member 55 is fitted to the second recessed portion 56c in the cam surface 56 of the arm part 40. In addition, the cam member 55 is fixed to the shaft member 54 of the rotation connection member 42, and only the arm part 40 is rotatable.

Therefore, when each arm part 40 rotates in the process of changing the state of the housings 1 and 2 from the open state to the intermediate standing state, the fitting projection 57 of the cam member 55 is moved against the urging force of the spring member 58 and is moved onto the projecting portion 56b on the cam surface 56. Thus, the engagement between the fitting projection 57 and the second recessed portion 56c in the cam surface 56 is canceled. Then, when each arm part 40 further rotates and the state of the housings 1 and 2 is changed to the intermediate standing state, the fitting projection 57 of the cam member 55 is fitted into the first recessed portion 56a in the cam surface 56. At this time, the fitting projection 57 is fitted into the first recessed portion 56a with a certain impact, owing to the urging force of the spring member 58.

Therefore, a clicking sound can be generated at the time when the fitting projection 57 is fitted into the first recessed portion 56a in the cam surface 56, thereby showing the user that the mobile phone has been set to the intermediate standing state.

In addition, the fitting projection 57 is fitted into the first recessed portion 56a in the cam surface 56 by the urging force of the spring member 58. Therefore, a clicking feeling can also be generated to show the user that the mobile phone has been set to the intermediate standing state.

In addition, the urging force of the spring member 58 is continuously applied to the fitting projection 57 fitted in the first recessed portion 56a in the cam surface 56. Therefore, the fitting projection 57 can be fitted in the first recessed portion 56a in the cam surface 56 a relatively large strength In accordance with the urging force of the spring member 58. Therefore, the intermediate standing state (or the closed state) of the housings 1 and 2 can be stably maintained.

Effects of Second Embodiment

As is clear from the above-described explanation, the mobile phone according to the second embodiment can be set to the intermediate standing state in which the first housing 1 obliquely stands on the second housing 2 in addition to the closed state in which the housings 1 and 2 substantially entirely overlap and the open state in which the display unit provided on the first housing 1 and the keyboard provided on the second housing 2 are positioned on the same plane.

Therefore, according to the second embodiment, the effects similar to those of the mobile phone according to the first embodiment can be obtained. In addition, when the housings 1 and 2 are set to the intermediate standing state, the user can easily view the display unit provided on the first housing 1 while operating the keyboard provided on the second housing 2. In addition, a television program, a video content, etc., displayed on the display unit provided on the first housing 1 can be easily viewed while the mobile phone is placed on a desk or the like.

Modifications

The above-described embodiments of the present invention are applied to mobile phones. However, the present invention may also be applied to other types of mobile terminal apparatuses, such as a personal handyphone system (PHS), a personal digital assistant (PDA), a mobile game device, and a digital camera. In any case, the above-described effects can be obtained.

The present application contains subject matter related to that disclosed in Japanese Priority Patent Application JP 2009-114951 filed in the Japan Patent Office on May 11, 2009, the entire content of which is hereby incorporated by reference.

The above-described embodiment are examples of the present invention, and the present embodiment is not limited to the above-described embodiments. It should be understood by those skilled in the art that various modifications, combinations, sub-combinations and alterations may occur depending on design requirements and other factors insofar as they are within the scope of the appended claims or the equivalents thereof.

What is claimed is:
1. A mobile terminal apparatus, comprising:
a first housing on which a display unit is provided at an open side of the first housing;
a second housing on which a keyboard is provided at an exposing side of the second housing, the exposing side being exposed when the first and second housings are in an open state; and
a slide holding mechanism configured to hold the first and second housings such that the first and second housings are slidable, wherein the slide holding mechanism includes
a rail unit provided in the first housing and including a pair of rail parts that extend along a sliding direction of the first and second housings,
a pair of arm members,
a pair of rotation-slide connection members, each rotation-slide connection member including a rotation shaft that extends in a direction perpendicular to the sliding direction and connecting one end portion of the corresponding arm member to the corresponding rail part such that the arm member is slidable and rotatable, extension lines of the rotation shafts included in the rotation-slide connection members being separated from each other by a predetermined distance in the sliding direction, and
a pair of rotation connection members, each rotation connection member including a rotation shaft that extends in the direction perpendicular to the sliding direction and connecting the other end portion of the corresponding arm member to the second housing such that the arm member is rotatable, extension lines of the rotation shafts included in the rotation connection members being separated from each other by the predetermined distance in the sliding direction,
wherein the slide holding mechanism holds the first and second housings such that the first and second housings are slidable between a closed state in which the first and second housings substantially entirely overlap and the open state in which the display unit provided on the first housing and the keyboard provided on the second housing are positioned on substantially the same plane and
wherein each one of the pair of rail parts has a rail guide slot, respective ones of the pair of rail guide slots are sized to rotatably and slidably receive a respective one of the pair of rotation-slide connection members and are offset from each other by the predetermined distance in the sliding direction.

2. The mobile terminal apparatus according to claim 1, further comprising:
a pair of first urging members provided on the respective rotation connection members and configured to urge the respective arm members in a direction for setting the first and second housings to the closed state.

3. The mobile terminal apparatus according to claim 1, further comprising:
a connection plate configured to connect the rotation-slide connection members to each other without changing the state in which the arm members are slidable and rotatable; and
a pair of second urging members, each second urging member including one end portion connected to the connection plate and the other end portion connected to the first housing, the second urging members transmitting an urging force to the arm members through the connection plate in the direction for setting the first and second housings to the closed state when a rotational position of each arm member corresponds to the closed state of the first and second housings and transmitting the urging force to the arm members through the connection plate in a direction for setting the first and second housings to the open state when the rotational position of each arm member corresponds to the open state of the first and second housings.

4. The mobile terminal apparatus according to claim 1,
wherein the rotation-slide connection members included in the slide holding mechanism include respective third urging members configured to apply an urging force to the first housing through the rail unit in a direction which is substantially perpendicular to a sliding direction of the rotation-slide connection members along the respective rail parts and in which the distance between the first and second housings is reduced, and
wherein, when the rotation-slide connection members slide along the respective rail parts in the rail unit in a process of setting the first and second housings to the open state and a contact area between the first and second housings is reduced to an area equal to or less than a predetermined area, the slide holding mechanism establishes an intermediate standing state in which the first housing obliquely stands on the second housing by rotating the rotation-slide connection members with the urging force of the third urging members in the direction in which the distance between the first and second housings is reduced.

5. The mobile terminal apparatus according to claim 4,
wherein each arm member includes a cam surface with a predetermined irregularly shaped portion at a section where the arm member is connected to the corresponding rotation connection member, and
wherein each rotation connection member includes
a substantially columnar shaft member configured to hold the corresponding arm member such that the arm member is rotatable along a circumferential direction of the shaft member,
a cam member fixed to the shaft member such that the cam member is not rotatable along the circumferential direction of the shaft member, the cam member including an irregularly shaped portion that is capable of being fitted to the irregularly shaped portion on the cam surface of the corresponding arm member, and
an urging member that extends along the longitudinal direction of the shaft member and urges the cam member against the cam surface of the corresponding arm member.

6. The mobile terminal apparatus according to claim 5,
wherein the predetermined distance in the sliding direction is 2 mm.

7. The mobile terminal apparatus according to claim 1,
wherein the predetermined distance in the sliding direction is 2 mm.

* * * * *